United States Patent
Nakagawa et al.

(10) Patent No.: US 12,165,676 B2
(45) Date of Patent: *Dec. 10, 2024

(54) MAGNETIC HEAD AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki (JP); Naoyuki Narita, Funabashi (JP); Masayuki Takagishi, Kunitachi (JP); Tomoyuki Maeda, Kawasaki (JP); Tazumi Nagasawa, Yokohama (JP); Kenichiro Yamada, Minato (JP); Akira Kikitsu, Yokohama (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,949

(22) Filed: Jun. 6, 2023

(65) Prior Publication Data

US 2023/0326482 A1  Oct. 12, 2023

Related U.S. Application Data

(62) Division of application No. 17/587,198, filed on Jan. 28, 2022, now Pat. No. 11,710,501.

(30) Foreign Application Priority Data

Jun. 10, 2021 (JP) .................. 2021-097133

(51) Int. Cl.
  *G11B 5/21* (2006.01)
  *G11B 5/127* (2006.01)
  *G11B 5/31* (2006.01)

(52) U.S. Cl.
  CPC .............. *G11B 5/21* (2013.01); *G11B 5/1278* (2013.01); *G11B 5/3146* (2013.01)

(58) Field of Classification Search
  None
  See application file for complete search history.

(56) References Cited

U.S. PATENT DOCUMENTS 7,450,349 B2 * 11/2008 Nishida ................ G11B 5/1278
7,616,412 B2    11/2009 Zhu et al.
(Continued)

FOREIGN PATENT DOCUMENTS

JP  2009-70541 A   4/2009
JP  4358279 B2     11/2009
(Continued)

*Primary Examiner* — William J Klimowicz
(74) *Attorney, Agent, or Firm* — Oblon, McClelland, Maier & Neustadt, L.L.P.

(57) ABSTRACT

According to one embodiment, a magnetic head includes a first magnetic pole, a second magnetic pole, a magnetic element, and a magnetic member. The magnetic element is provided between the first and second magnetic poles, and includes a first magnetic layer. The magnetic member includes a first magnetic part. A second direction from the first magnetic part to the magnetic element crosses a first direction from the first to second magnetic pole. The first magnetic part includes a magnetic material including at least one of first to third materials. The first material includes at least one selected from the group consisting of $Mn_3Sn$, $Mn_3Ge$ and $Mn_3Ga$. The second material includes at least one selected from the group consisting of a cubic or tetragonal compound including Mn and Ni, a cubic alloy including (Continued)

γ-phase Mn, and a cubic alloy including Fe. The third material includes an antiferromagnet.

20 Claims, 25 Drawing Sheets

(56) References Cited

U.S. PATENT DOCUMENTS

| | | | |
|---|---|---|---|
| 8,411,390 B2* | 4/2013 | Franca-Neto | G11B 5/1278 360/123.06 |
| 9,196,271 B1 | 11/2015 | Shirotori | |
| 11,710,501 B2* | 7/2023 | Nakagawa | G11B 5/3146 428/812 |
| 2003/0200751 A1 | 10/2003 | Thompson, Jr. | |
| 2006/0119984 A1 | 6/2006 | Nishida | |
| 2009/0052095 A1 | 2/2009 | Yamada et al. | |
| 2009/0080105 A1 | 3/2009 | Takashita | |
| 2009/0080106 A1 | 3/2009 | Shimizu | |
| 2012/0069474 A1 | 3/2012 | Takagishi | |
| 2012/0304739 A1 | 12/2012 | Komatsu | |
| 2015/0243308 A1 | 8/2015 | Takagishi | |
| 2016/0380186 A1 | 12/2016 | Daibou | |
| 2020/0005816 A1 | 1/2020 | Tomoda | |
| 2020/0075047 A1* | 3/2020 | Narita | G11B 5/235 |
| 2021/0056987 A1* | 2/2021 | Wu | G11B 5/3146 |
| 2022/0005497 A1 | 1/2022 | Takagishi et al. | |
| 2022/0270640 A1* | 8/2022 | Nakagawa | G11B 5/1877 |
| 2023/0267961 A1* | 8/2023 | Nagasawa | G11B 5/21 360/75 |
| 2024/0062776 A1* | 2/2024 | Kimura | G11B 5/3133 |

FOREIGN PATENT DOCUMENTS

| | | |
|---|---|---|
| JP | 6611167 B2 | 11/2019 |
| JP | 2022-12263 A | 1/2022 |

* cited by examiner

US 12,165,676 B2

MAGNETIC HEAD AND MAGNETIC RECORDING DEVICE

CROSS-REFERENCE TO RELATED APPLICATIONS

This application is a divisional of and claims benefit under 35 U.S.C. § 120 to U.S. application Ser. No. 17/587,198 filed Jan. 28, 2022, which is based upon and claims the benefit of priority under 35 U.S.C. § 119 from Japanese Patent Application No. 2021-097133, filed Jun. 10, 2021, the entire contents of each of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve the recording density in the magnetic head and the magnetic recording device.

DETAILED DESCRIPTION

Figure 1A:
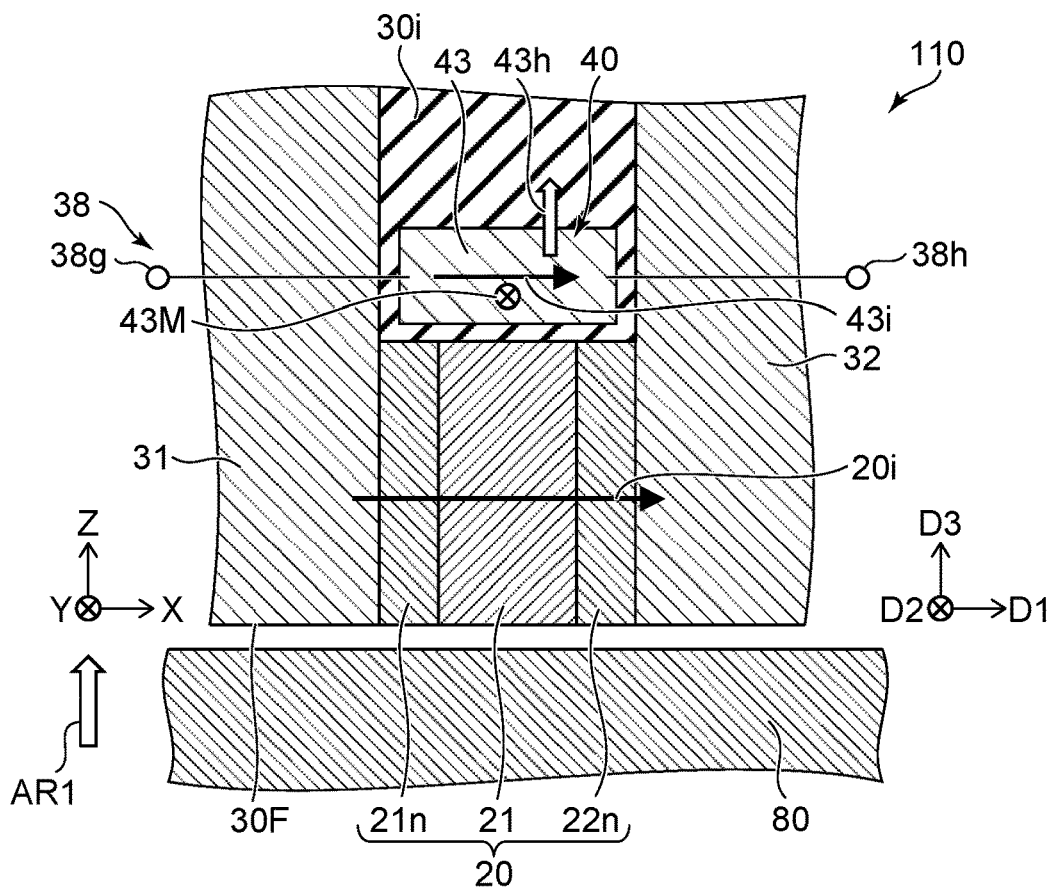
FIGS. 1A and 1B are schematic views illustrating a magnetic head according to a first embodiment.

According to one embodiment, a magnetic head includes a first magnetic pole, a second magnetic pole, a magnetic element, and a magnetic member. The magnetic element is provided between the first magnetic pole and the second magnetic pole, and includes a first magnetic layer. The magnetic member includes a first magnetic part. A second direction from the first magnetic part to the magnetic element crosses a first direction from the first magnetic pole to the second magnetic pole. The first magnetic part includes a magnetic material including at least one of a first material, a second material or a third material. The first material includes at least one selected from the group consisting of $Mn_3Sn$, $Mn_3Ge$ and $Mn_3Ga$. The second material includes at least one selected from the group consisting of a cubic or tetragonal compound including Mn and Ni, a cubic alloy including γ-phase Mn, and a cubic alloy including Fe. The third material includes an antiferromagnet.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
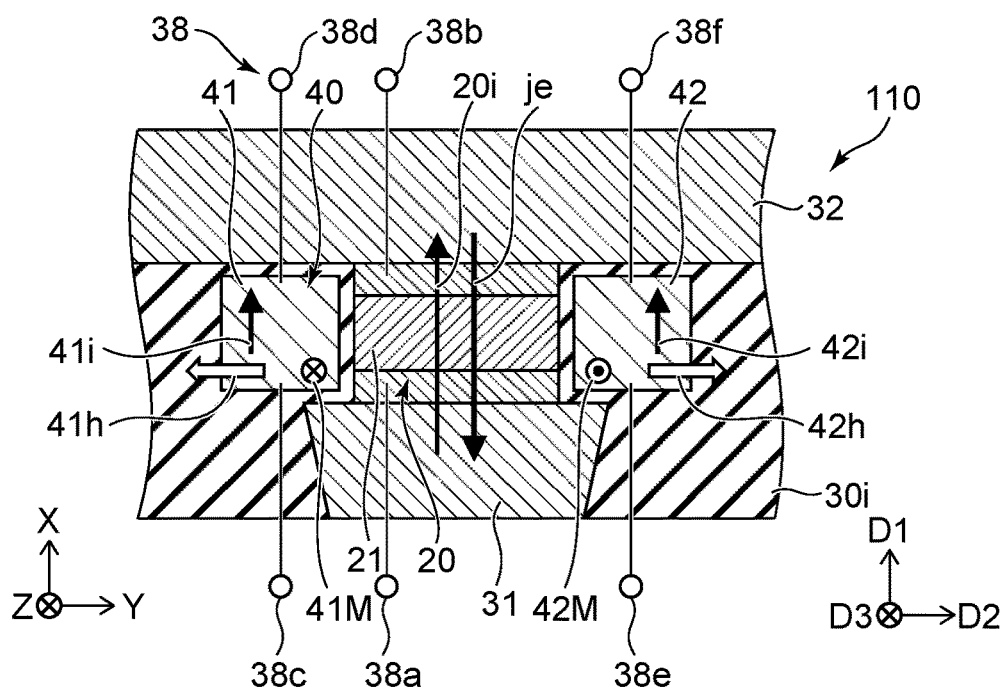
Figure 2:
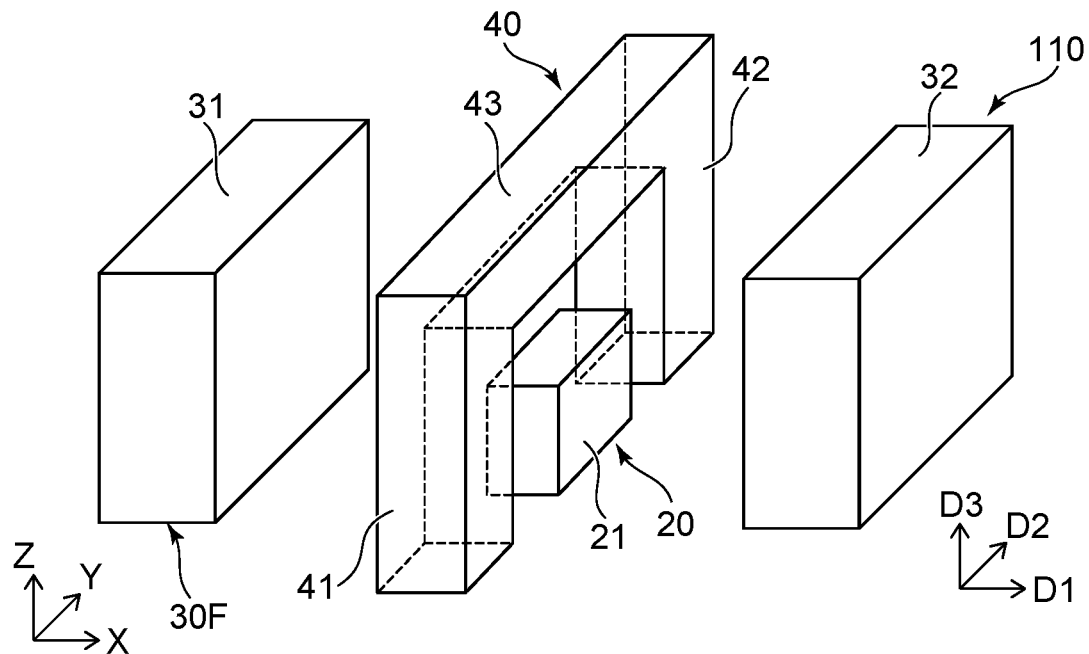
FIG. 2 is a schematic perspective view illustrating the magnetic head according to the first embodiment.
Figure 3:
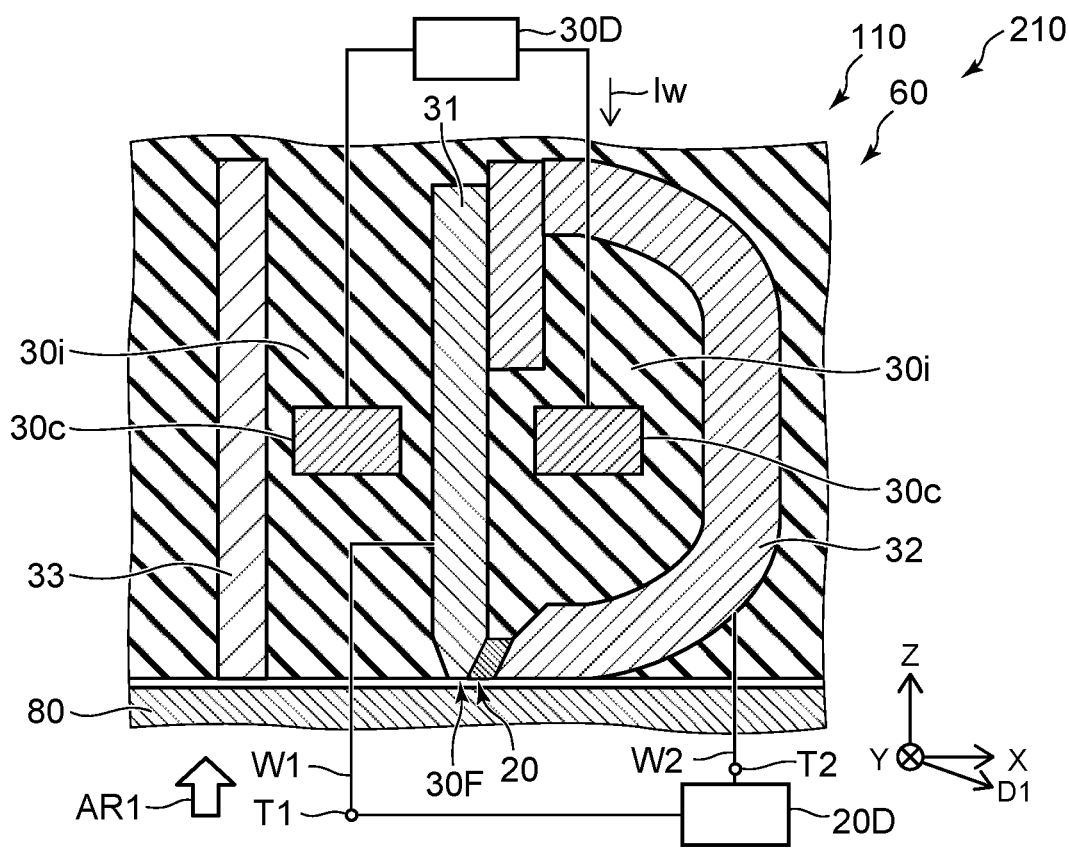
FIG. 3 is a cross-sectional view illustrating a magnetic recording device according to the first embodiment.

FIGS. 1A and 1B are schematic views illustrating a magnetic head according to a first embodiment.
FIG. 1A is a cross-sectional view. FIG. 1B is a plan view seen from the arrow AR1 of FIG. 1A.
FIG. 2 is a schematic perspective view illustrating the magnetic head according to the first embodiment.
FIG. 3 is a cross-sectional view illustrating a magnetic recording device according to the first embodiment.
As shown in FIG. 3, a magnetic recording device 210 according to the embodiment includes a magnetic head 110 and an electric circuit 20D. The magnetic recording device 210 may include a magnetic recording medium 80. At least the recording operation is performed in the magnetic recording device 210. In the recording operation, information is recorded on the magnetic recording medium 80 by using the magnetic head 110.

The magnetic head 110 includes a recording part 60. As described later, the magnetic head 110 may include a reproduction part. The recording part 60 includes a first magnetic pole 31, a second magnetic pole 32, and a magnetic element 20. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a major magnetic pole. The second magnetic pole 32 is, for example, a trailing shield. The first magnetic pole 31 may be a trailing shield, and the second magnetic pole 32 may be a major magnetic pole.

A direction from the magnetic recording medium 80 to the magnetic head 110 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 110 move relatively along the down-track direction. A magnetic field (recording magnetic field) generated from the magnetic head 110 is applied to a desired position of the magnetic recording medium 80. The magnetization of the magnetic recording medium 80 at the desired position is controlled in a direction corresponding to the recording magnetic field. As a result, information is recorded on the magnetic recording medium 80.

A direction from the first magnetic pole 31 to the second magnetic pole 32 is defined as a first direction D1. The first direction D1 is substantially along the X-axis direction. In the embodiment, the first direction D1 may be inclined at a small angle with respect to the X-axis direction. The absolute value of an angle between the first direction D1 and the X-axis direction is, for example, not more than 30 degrees.

As shown in FIG. 3, a coil 30c is provided. In this example, a part of the coil 30c is between the first magnetic pole 31 and the second magnetic pole 32. In this example, a shield 33 is provided. In the X-axis direction, there is the first magnetic pole 31 between the shield 33 and the second magnetic pole 32. Another part of the coil 30c is between the shield 33 and the first magnetic pole 31. An insulating member 30i is provided at least in a part between these multiple elements. The shield 33 is, for example, a leading shield. The magnetic head 110 may include a side shield (not shown).

As shown in FIG. 3, a recording current Iw is supplied to the coil 30c from a recording circuit 30D. The recording magnetic field corresponding to the recording current Iw is applied to the magnetic recording medium 80 from the first magnetic pole 31.

As shown in FIG. 3, at least one of the first magnetic pole 31 or the second magnetic pole 31 includes a medium-facing surface 30F. The medium-facing surface 30F is, for example, ABS (Air Bearing Surface). The medium-facing surface 30F faces, for example, the magnetic recording medium 80. The medium-facing surface 30F is, for example, along the X-Y plane. For example, the first direction D1 is along the medium-facing surface 30F. The absolute value of an angle between the first direction D1 and the medium-facing surface 30F is, for example, not more than 30 degrees.

As shown in FIG. 3, the electric circuit 20D is electrically connected to the magnetic element 20. In this example, the magnetic element 20 is electrically connected to the first magnetic pole 31 and the second magnetic pole 32. The magnetic head 110 is provided with a first terminal T1 and a second terminal T2. The first terminal T1 is electrically connected to the magnetic element 20 via a first wiring W1 and the first magnetic pole 31. The second terminal T2 is electrically connected to the magnetic element 20 via a second wiring W2 and the second magnetic pole 32. From the electric circuit 20D, for example, a current (for example, a direct current) is supplied to the magnetic element 20.

As shown in FIG. 1A, the magnetic element 20 includes a first magnetic layer 21. The first magnetic layer 21 is provided between the first magnetic pole 31 and the second magnetic pole 32. In this example, the magnetic element 20 further includes a first non-magnetic layer 21n and a second non-magnetic layer 22n. The first non-magnetic layer 21n is provided between the first magnetic pole 31 and the first magnetic layer 21. The second non-magnetic layer 22n is provided between the first magnetic layer 21 and the second magnetic pole 32. The first magnetic layer 21 is, for example, a ferromagnetic layer. The first magnetic layer 21 includes, for example, at least one selected from the group consisting of Fe, Co and Ni.

For example, the first non-magnetic layer 21n may be in contact with the first magnetic pole 31 and the first magnetic layer 21. The second non-magnetic layer 22n may be in contact with the first magnetic layer 21 and the second magnetic pole 32.

As shown in FIG. 1B, an element current 20i is supplied to such a magnetic element 20. The element current 20i is supplied from, for example, the electric circuit 20D described above. As shown in FIG. 1B, the element current 20i has an orientation from the first magnetic pole 31 to the second magnetic pole 32. As shown in FIG. 1B, an electron flow je associated with the element current 20i has an orientation from the second magnetic pole 32 to the first magnetic pole 31.

For example, when the element current 20i not less than the threshold value flows through the magnetic element 20, the orientation of magnetization of the first magnetic layer 21 is reversed. As a result, the magnetic field (recording magnetic field) generated from the magnetic poles is less likely to be directed toward the magnetic element 20, and is more likely to be directed toward the magnetic recording medium 80. The recording magnetic field is more effectively applied to the magnetic recording medium 80. This enables more efficient recording. In this case, the magnetic element 20 functions as an FCL (Flux Control Layer).

As will be described later, the magnetic element 20 may further include another magnetic layer (second magnetic layer) and another non-magnetic layer (third non-magnetic layer). In this configuration, when the element current 20i not less than the threshold value flows through the magnetic element 20, the magnetization of the magnetic layer (first magnetic layer 21 or second magnetic layer) included in the magnetic element 20 oscillates. The magnetic element 20 functions as, for example, an STO (Spin-Torque Oscillator). An alternating magnetic field (for example, a high frequency magnetic field) is generated from the magnetic element 20 with the oscillation. The alternating magnetic field generated by the magnetic element 20 is applied to the magnetic recording medium 80, and writing to the magnetic recording medium 80 is assisted. For example, MAMR (Microwave Assisted Magnetic Recording) can be performed.

By providing the magnetic element 20 in this way, more effective magnetic recording can be performed. When the element current 20*i* flows through the magnetic element 20, the temperature of the magnetic element 20 may rise excessively, making it difficult to obtain a desired operation. By effectively discharging the heat of the magnetic element 20, the temperature rise of the magnetic element 20 can be suppressed, and the desired operation can be efficiently performed.

As shown in FIGS. 1B and 2, in the embodiment, a magnetic member 40 is provided in the magnetic head 110. The magnetic member 40 includes a first magnetic part 41. The magnetic member 40 may further include a second magnetic part 42 and a third magnetic part 43. The first magnetic part 41, the second magnetic part 42, and the third magnetic part 43 include a magnetic material described later. In FIG. 2, the insulating member 30*i* is omitted.

As shown in FIGS. 1B and 2, a second direction D2 from the first magnetic part 41 to the magnetic element 20 (for example, the first magnetic layer 21) crosses the first direction D1 from the first magnetic pole 31 to the second magnetic pole 32.

When the magnetic member 40 includes the first magnetic part 41 and the second magnetic part 42, the magnetic element (for example, the first magnetic layer 21) is between the first magnetic part 41 and the second magnetic part 42 in the second direction D2. The positions of the first magnetic part 41 and the second magnetic part 42 are interchangeable with each other.

When the magnetic member 40 includes the third magnetic part 43, a direction from the magnetic element 20 (for example, the first magnetic layer 21) to the third magnetic part 43 is along a third direction D3. The third direction D3 crosses a plane including the first direction D1 and the second direction D2. The third direction D3 may be substantially along the Z-axis direction. As shown in FIG. 1A, there is a magnetic element 20 (first magnetic layer 21) between the magnetic recording medium 80 and the third magnetic part 43. For example, there is at least a part of the magnetic element 20 between the medium-facing surface 30F and the third magnetic part 43.

The first magnetic part 41, the second magnetic part 42, and the third magnetic part 43 may be continuous with each other. The boundary between the first magnetic part 41, the second magnetic part 42, and the third magnetic part 43 may be clear or unclear. The first magnetic part 41, the second magnetic part 42, and the third magnetic part 43 may be separated from each other. As described later, the first magnetic part 41 may be provided at the position of the third magnetic part 43.

The magnetic material included in the first magnetic part 41, the second magnetic part 42, and the third magnetic part 43 includes at least one of a first material, a second material, or a third material. The first material includes at least one selected from the group consisting of $Mn_3Sn$, $Mn_3Ge$ and $Mn_3Ga$. The second material includes at least one selected from the group consisting of a cubic or tetragonal compound including Mn and Ni, a cubic alloy including γ-phase Mn, and a cubic alloy including Fe. The third material includes an antiferromagnet.

Since the current flows in a state where a magnetic field is applied to the magnetic member 40 including such a magnetic material, the heat of the magnetic element 20 can be efficiently transferred and the heat can be efficiently discharged. For example, the magnetic element 20 is cooled.

This is considered to be due to, for example, the anomalous Ettingshausen effect. As a result, the temperature rise of the magnetic element 20 is suppressed, and the desired operation can be efficiently performed. For example, the recording magnetic field is effectively applied to the magnetic recording medium 80 by reversing the orientation of magnetization of the magnetic layer. Alternatively, stable magnetization oscillation can be obtained, and efficient assist operation can be performed. This makes it possible to provide a magnetic head capable of improving the recording density.

The magnetic field applied to the magnetic member 40 may be, for example, a magnetic field generated from at least one of the first magnetic pole 31 or the second magnetic pole 32. The magnetic field applied to the magnetic member 40 may be, for example, a magnetic field generated from the side shield. For example, the magnetic field applied to the magnetic member 40 may be, for example, a magnetic field based on the element current 20*i* flowing through the magnetic element 20.

As shown in FIGS. 1A and 1B, the magnetic head 110 may include multiple terminals 38. The multiple terminals 38 may include, for example, terminals 38*a* to 38*h*. At least two of these terminals 38 may be used in common. A current is supplied to the magnetic element 20 and the magnetic member 40 by these multiple terminals 38. For example, the terminal 38*a* may correspond to the first terminal T1 illustrated in FIG. 3. For example, the terminal 38*b* may correspond to the second terminal T2 illustrated in FIG. 3.

As shown in FIG. 1B, for example, the element current 20*i* supplied via at least a part of the multiple terminals 38 (for example, the terminals 38*a* and 38*b*) flows through the magnetic element 20 along the first direction D1. As a result, the magnetization of the first magnetic layer 21 is reversed. Or, oscillation occurs.

A first magnetic part current 41*i* supplied via at least a part (terminal 38*c* and terminal 38*d*) of the multiple terminals 38 flows through the first magnetic part 41 along the first direction D1. As a result, a heat flow 41*h* is generated. An orientation of the heat flow 41*h* includes, for example, a component of an orientation from the magnetic element 20 to the first magnetic part 41. The heat of the magnetic element 20 is efficiently discharged by the heat flow 41*h*.

As shown in FIG. 1B, the second magnetic part current 42*i* supplied via at least a part (terminal 38*e* and terminal 38*f*) of the multiple terminals 38 flows through the second magnetic part 42 along first direction D1. As a result, a heat flow 42*h* is generated. An orientation of the heat flow 42*h* includes, for example, a component of an orientation from the magnetic element 20 to the second magnetic part 42. The heat of the magnetic element 20 is efficiently discharged by the heat flow 42*h*.

As shown in FIG. 1A, the third magnetic part current 43*i* supplied via at least a part (terminal 38*g* and terminal 38*h*) of the multiple terminals 38 flows through the third magnetic part 43 along the first direction D1. As a result, a heat flow 43*h* is generated. An orientation of the heat flow 43*h* includes, for example, a component in an orientation from the magnetic element 20 to the third magnetic part 43. The heat of the magnetic element 20 is efficiently discharged by the heat flow 43*h*.

For example, at least one of the terminals 38*a* to 38*h* may be omitted, and at least one of the first to third magnetic part currents 41*i* to 43*i* may be supplied via the terminals 38*a* and 38*b* (for example, the first terminal T1 and the second terminal T2).

As shown in FIG. 1B, the orientation of the magnetization 41M of the first magnetic part 41 may be along the third direction D3. The third direction D3 crosses the plane including the first direction D1 and the second direction D2. The orientation of the magnetization 42M of the second magnetic part 42 may be along the third direction D3. The orientation of the magnetization 42M of the second magnetic part 42 preferably includes a component opposite to the orientation of the magnetization 41M of the first magnetic part 41. It is easy to obtain stable magnetization. Heat is easily discharged. As shown in FIG. 1A, the orientation of the magnetization 43M of the third magnetic part 43 may be along the second direction D2. The orientation of the magnetization 43M of the third magnetic part 43 preferably includes a component along the orientation of the magnetic field generated by the magnetization 41M of the first magnetic part 41 and the magnetization 42M of the second magnetic part 42. It is easy to obtain stable magnetization. Heat is easily discharged. For example, in the first magnetic part 41, the second magnetic part 42, and the third magnetic part 43, the orientation of magnetization may change continuously.

When the magnetic material of the magnetic member 40 is antiferromagnetic, the orientation of the magnetization in the first to third magnetic parts 41 to 43 may be unclear.

For example, the first to third magnetic parts 41 to 43 do not overlap the first magnetic pole 31 in the second direction D2. For example, the first to third magnetic parts 41 to 43 do not overlap the second magnetic pole 32 in the second direction D2.

Figure 4A:
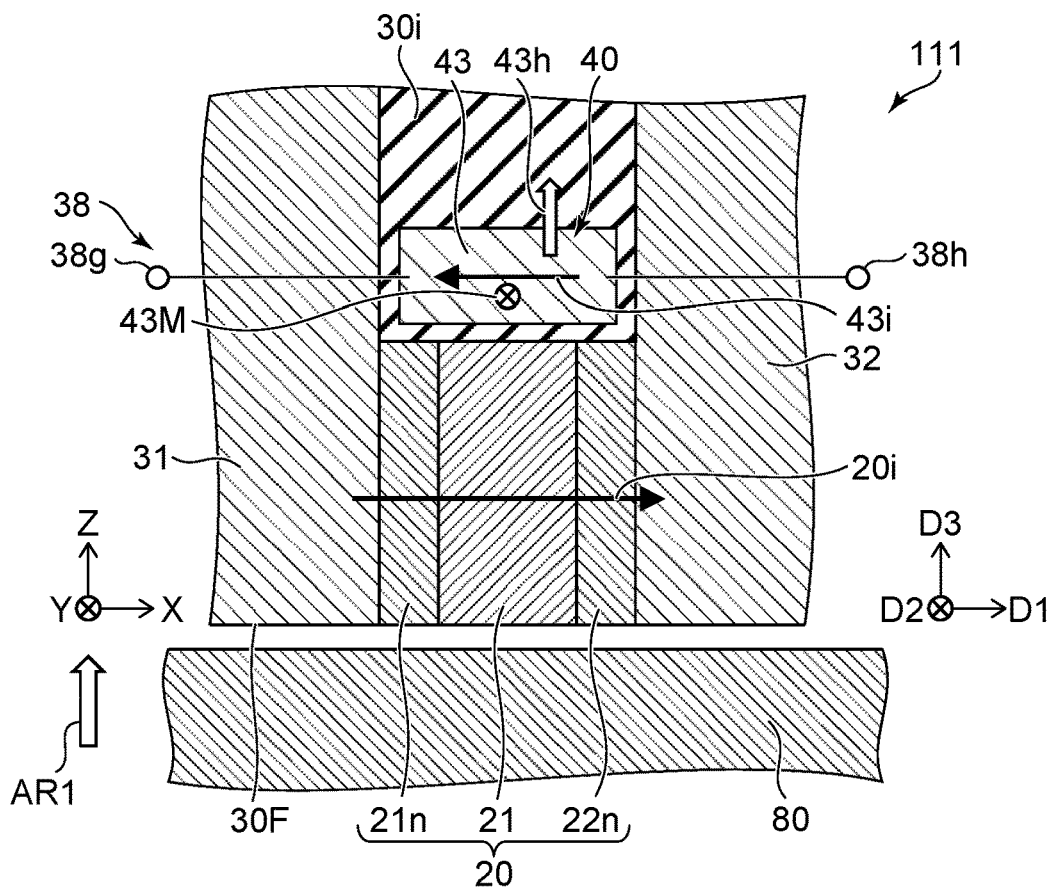
FIGS. 4A and 4B are schematic views illustrating a magnetic head according to the first embodiment.
Figure 4B:
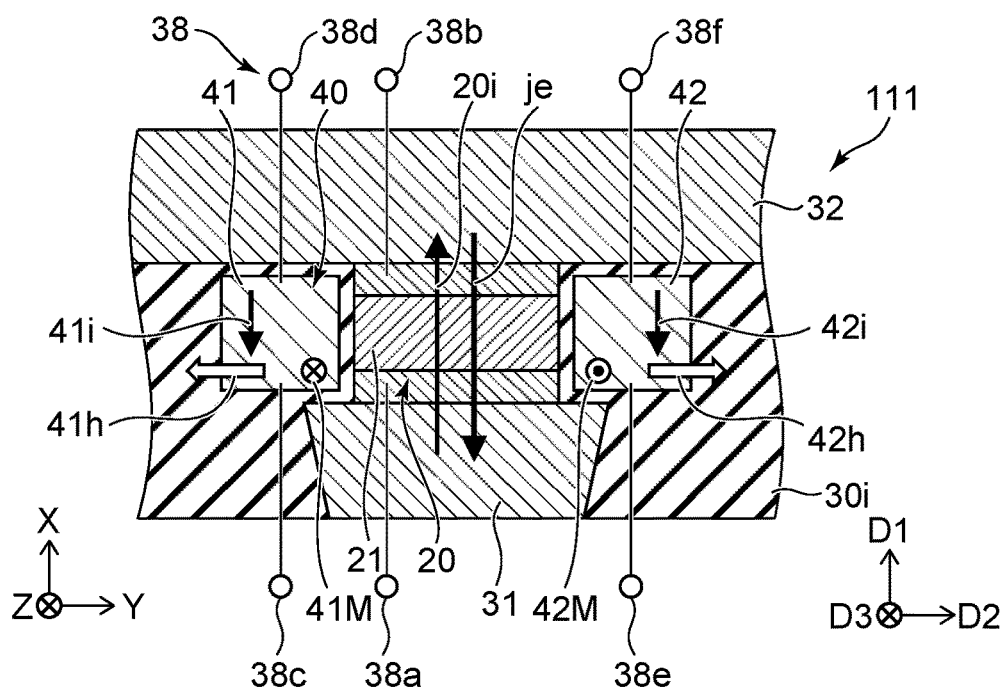

FIGS. 4A and 4B are schematic views illustrating a magnetic head according to the first embodiment.

FIG. 4A is a cross-sectional view. FIG. 4B is a plan view seen from the arrow AR1 of FIG. 4A.

As shown in FIGS. 4A and 4B, the magnetic member 40 also includes the first to third magnetic parts 41 to 43 in a magnetic head 111 according to the embodiment. In the magnetic head 111, an orientation of the first magnetic part current 41i is opposite to an orientation of the element current 20i. For example, an orientation of the second magnetic part current 42i is opposite to the orientation of the element current 20i. An orientation of the third magnetic part current 43i is opposite to the orientation of the element current 20i. Also in the magnetic head 111, the first to third magnetic part currents 41i to 43i are along the first direction D1.

For example, in the magnetic head 111, the sign of the magnetic thermoelectric effect in the magnetic material included in the magnetic member 40 is opposite to that in the magnetic head 110. Alternatively, for example, in the magnetic head 111, the orientation of magnetization in the magnetic member 40 is opposite to that in the magnetic head 110. Also in the magnetic head 111, the heat of the magnetic element 20 can be efficiently discharged by the heat flows 41h to 43h.

The magnetic field applied to the magnetic member 40 may be, for example, a magnetic field generated from at least one of the first magnetic pole 31 or the second magnetic pole 32. The magnetic field applied to the magnetic member 40 may be, for example, a magnetic field generated from the side shield. For example, the magnetic field applied to the magnetic member 40 may be, for example, a magnetic field based on the element current 20i flowing through the magnetic element 20.

Figure 5A:
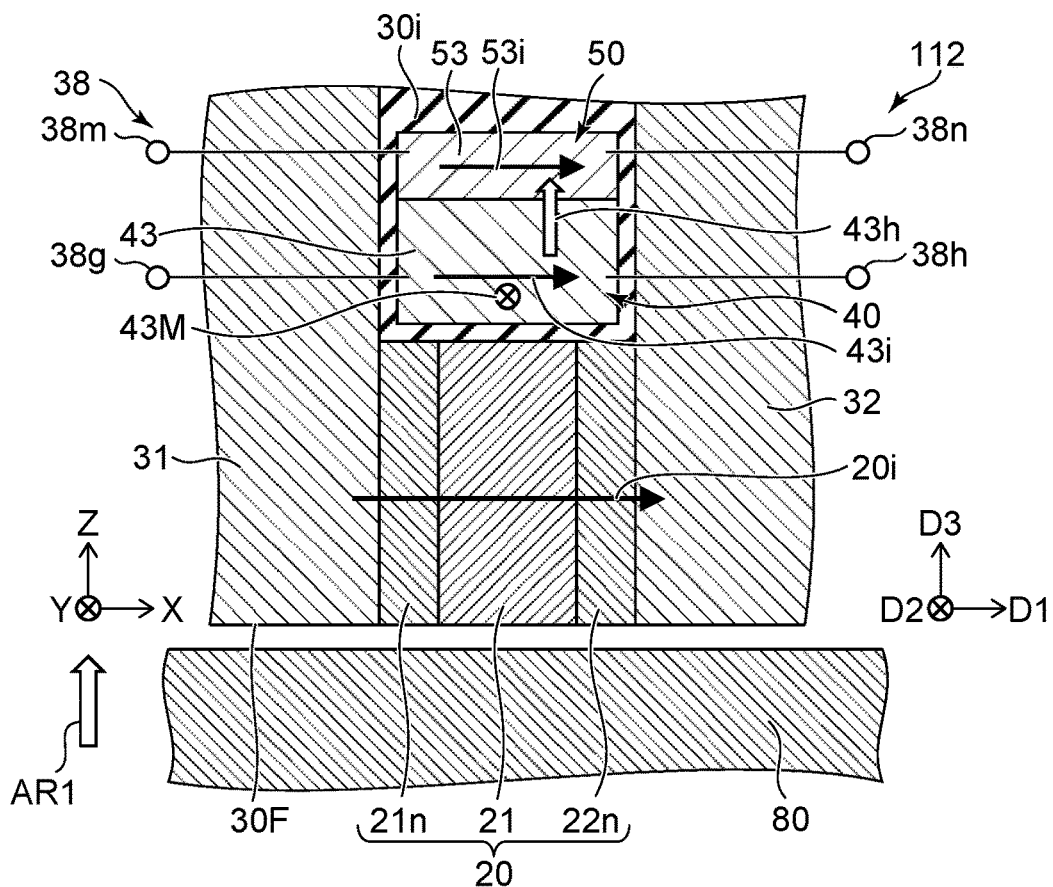
FIGS. 5A and 5B are schematic views illustrating a magnetic head according to the first embodiment.
Figure 5B:
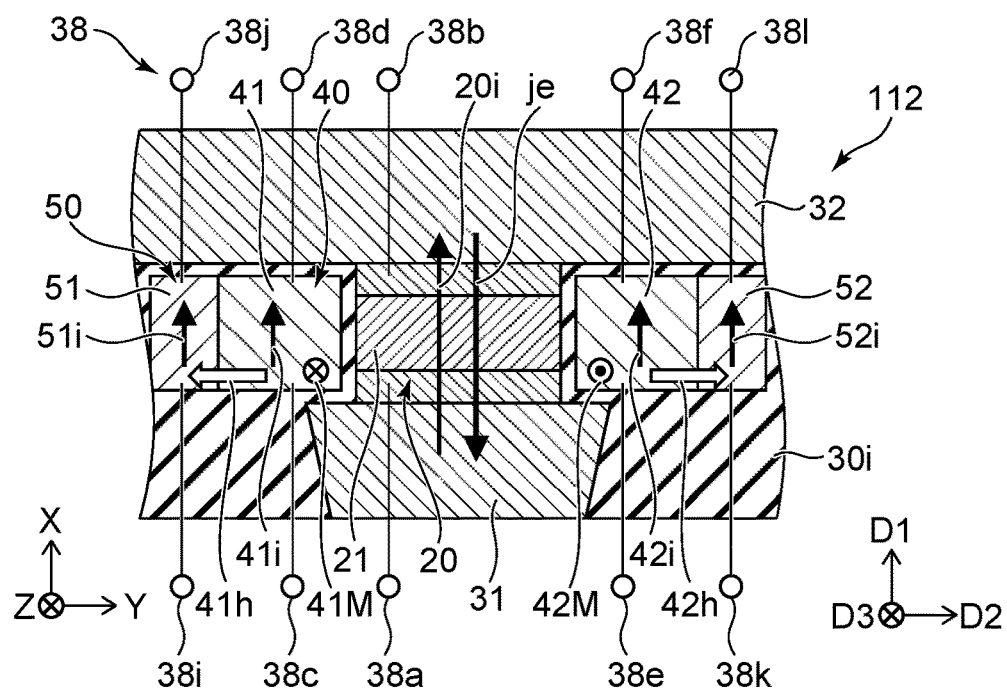

FIGS. 5A and 5B are schematic views illustrating a magnetic head according to the first embodiment.

FIG. 5A is a cross-sectional view. FIG. 5B is a plan view seen from the arrow AR1 of FIG. 5A.

As shown in FIGS. 5A and 5B, a magnetic head 112 according to the embodiment further includes a conductive member 50. Except for this, the configuration of the magnetic head 112 may be the same as the configuration of the magnetic head 110 or the magnetic head 111.

The conductive member 50 includes the first conductive part 51. In this example, the conductive member 50 further includes a second conductive part 52 and a third conductive part 53.

A direction from the first conductive part 51 to the first magnetic part 41 is along the second direction D2. The element current 20i supplied via at least a part (terminal 38a and terminal 38b) of the multiple terminals 38 flows through the magnetic element 20 along the first direction D1. The first magnetic part current 41i supplied via at least a part (terminal 38c and terminal 38d) of the multiple terminals 38 flows through the first magnetic part 41 along the first direction D1. A first conductive part current 51i supplied via at least a part (terminal 38i and terminal 38j) of the multiple terminals 38 flows through the first conductive part 51 along the first direction D1.

When the first conductive part current 51i flows through such a conductive member 50 (first conductive part 51), the magnetization of the magnetic member 40 (first magnetic portion 41) is appropriately controlled. This is considered to be based on, for example, the spin-orbit torque injected from the conductive member 50 into the magnetic member 40. For example, the magnetization of the magnetic member 40 is appropriately controlled even when the orientation of the recording magnetic field generated by at least one of the first magnetic pole 31 or the second magnetic pole 32 changes. By supplying an electric current (the first to third magnetic part currents 41i to 43i) to such a magnetic member 40, the heat flow 41h or the like is appropriately generated. As a result, the heat of the magnetic element 20 can be efficiently discharged.

For example, in the magnetic head 112, the sign of the magnetic thermoelectric effect in the magnetic material included in the magnetic member 40 is the same as that in the magnetic head 110, and the conductive member 50 (first to third conductive parts 51 to 53) includes, for example, at least one selected from the group consisting of Pt, Pd and Au. The conductive member 50 includes, for example, a heavy metal. In these materials, the sign of spin-orbit torque (e.g., spin Hall angle) is positive. Since the current flows through the conductive member 50 including such a material, the magnetization of the magnetic member 40 can be efficiently controlled.

Alternatively, for example, in the magnetic head 112, the sign of the magnetic thermoelectric effect in the magnetic material included in the magnetic member 40 is opposite to that in the magnetic head 110, and the conductive member 50 (first to third conductive parts 51 to 53) includes, for example, at least one selected from the group consisting of Ta (e.g., β-Ta) and W (e.g., β-W). The conductive member 50 includes, for example, a heavy metal. In these materials, the sign of spin-orbit torque (e.g., spin Hall angle) is negative. Since the current flows through the conductive member 50 including such a material, the magnetization of the magnetic member 40 can be efficiently controlled.

As shown in FIG. 5B, the first magnetic layer 21 is between the first conductive part 51 and the second conductive part 52 in the second direction D2. As described above, the second magnetic part current 42i supplied via at least a part (terminal 38e and terminal 38f) of the multiple terminals 38 flows through the second magnetic part 42 along the first direction D1. A second conductive part current 52i supplied via at least a part (terminal 38k and terminal 38l) of the multiple terminals 38 flows through the second conductive part 52 along the first direction D1.

As shown in FIG. 5B, in this example, the first magnetic part 41 is between the first conductive part 51 and the magnetic element 20 (first magnetic layer 21) in the second direction D2. The second magnetic part 42 is between the magnetic element (first magnetic layer 21) and the second conductive part 52 in the second direction D2.

As shown in FIG. 5A, a direction from the magnetic element 20 (first magnetic layer 21) to the third conductive part 53 is along the third direction D3. In this example, the third magnetic part 43 is between the magnetic element 20 (first magnetic layer 21) and the third conductive part 53. As described above, the third magnetic part current 43i supplied via at least a part (terminal 38g and terminal 38h) of the multiple terminals 38 flows through the third magnetic part 43 along the first direction D1. A third conductive part current 53i supplied via at least a part (terminal 38m and terminal 38n) of the multiple terminals 38 flows through the third conductive part 53 along the first direction D1.

For example, at least one of the terminals 38i to 38n may be omitted, and at least one of the first to third conductive part currents 51i to 53i may be supplied via the terminals 38a and 38b (for example, the first terminal T1 and the second terminal T2). At least one of the first to third conductive part currents 51i to 53i may be supplied via at least one of the terminals 38a to 38h.

In one example, the conductive member 50 is in contact with the magnetic member 40. As described later, a non-magnetic member may be provided between the conductive member 50 and the magnetic member 40.

Figure 6A:
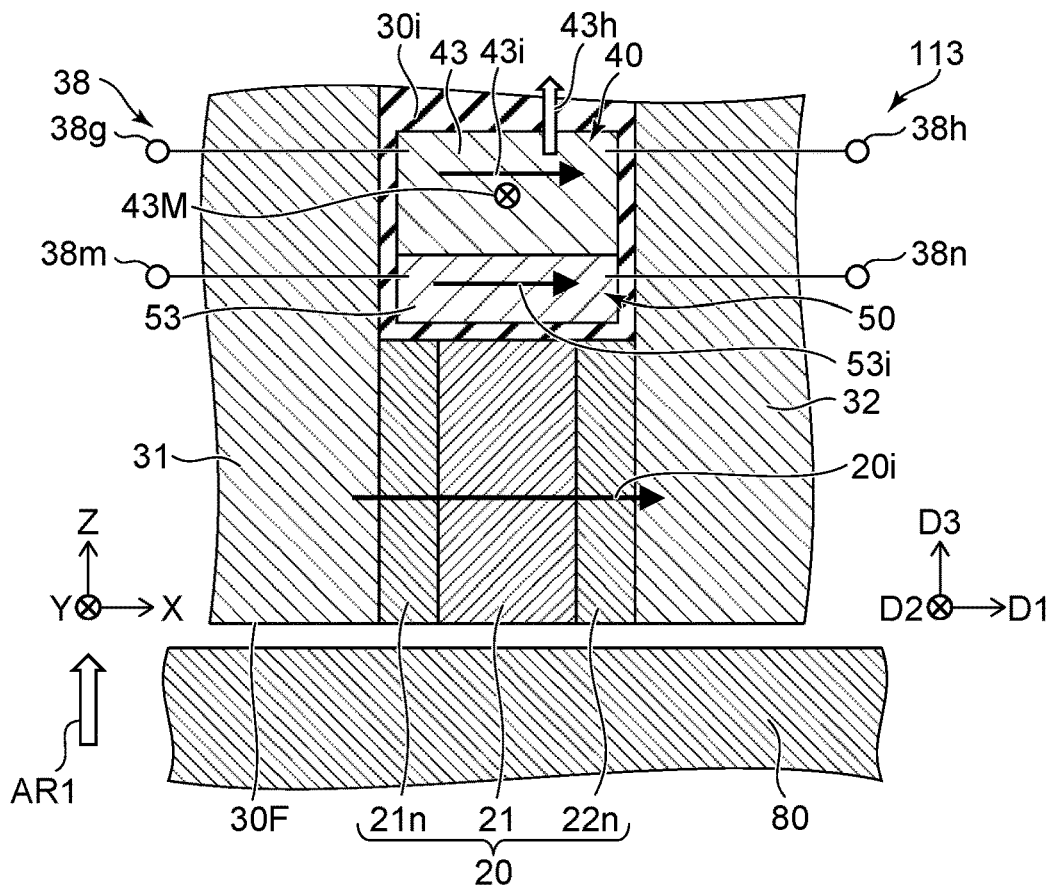
FIGS. 6A and 6B are schematic views illustrating a magnetic head according to the first embodiment.
Figure 6B:
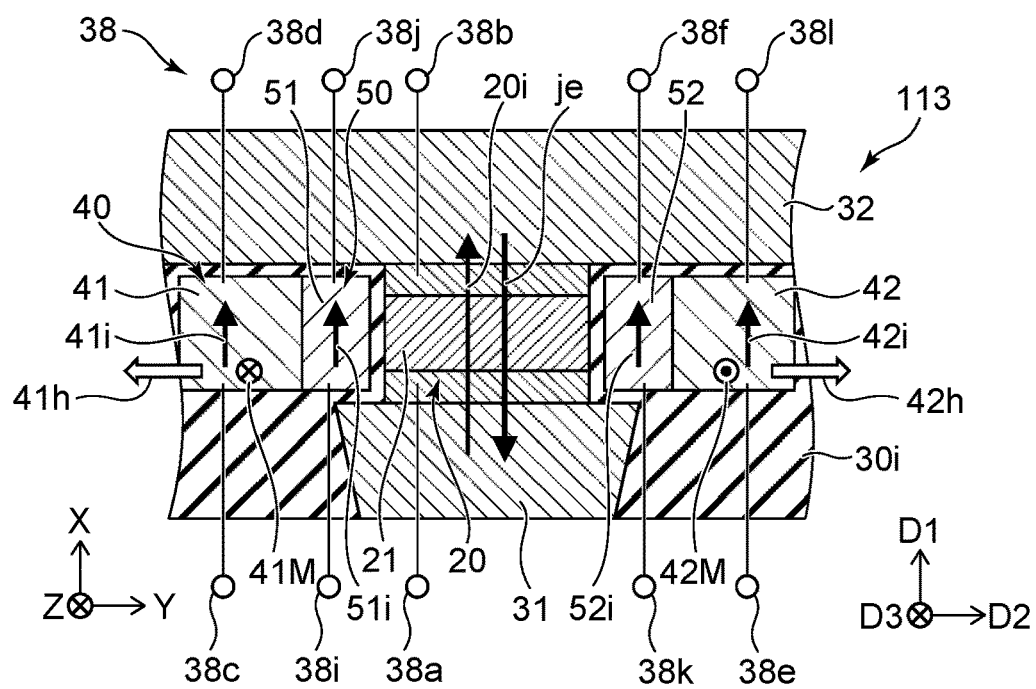

FIGS. 6A and 6B are schematic views illustrating a magnetic head according to the first embodiment.

FIG. 6A is a cross-sectional view. FIG. 6B is a plan view seen from the arrow AR1 of FIG. 6A.

As shown in FIGS. 6A and 6B, a magnetic head 113 according to the embodiment further includes the conductive member 50. Except for this, the configuration of the magnetic head 113 may be the same as the configuration of the magnetic head 110 or the magnetic head 111. The conductive member 50 includes the first conductive part 51. In this example, the conductive member 50 further includes the second conductive part 52 and the third conductive part 53.

Also in the magnetic head 113, the direction from the first conductive part 51 to the first magnetic part 41 is along the second direction D2. In the magnetic head 113, the first conductive part 51 is between the first magnetic part 41 and the magnetic element 20 (first magnetic layer 21) in the second direction D2. The second conductive part 52 is between the magnetic element 20 (first magnetic layer 21) and the second magnetic part 42 in the second direction D2. The third conductive part 53 is between the magnetic element 20 (first magnetic layer 21) and the third magnetic part 43.

In the magnetic head 113, the sign of the magnetic thermoelectric effect in the magnetic material included in the magnetic member 40 is the same as that in the magnetic head 110, and the conductive member 50 (first to third conductive parts 51 to 53) includes, for example, at least one selected from the group consisting of Ta (e.g., β-Ta) and W (e.g., β-W). The conductive member 50 includes, for example, a heavy metal. In these materials, the sign of spin-orbit torque (e.g., spin Hall angle) is negative. Since the current flows through the conductive member 50 including such a material, the magnetization of the magnetic member 40 can be efficiently controlled.

For example, in the magnetic head 113, the sign of the magnetic thermoelectric effect in the magnetic material included in the magnetic member 40 is opposite to that in the magnetic head 110, and the conductive members 50 (first to third conductive parts 51 to 53) includes, for example, at least one selected from the group consisting of Pt, Pd and Au. The conductive member 50 includes, for example, a heavy metal. In these materials, the sign of spin-orbit torque (e.g., spin Hall angle) is positive. Since the current flows through the conductive member 50 including such a material, the magnetization of the magnetic member 40 can be efficiently controlled.

For example, since the currents (first to third conductive parts currents 51i to 53i) flow through the conductive members 50 (first to third conductive parts 51 to 53), the magnetization of 43 of the magnetic member 40 (first to third magnetic parts 41 to 53i) is appropriately controlled. This is considered to be based on, for example, the spin-orbit torque injected from the conductive member 50 into the magnetic member 40. For example, the magnetization of the magnetic member 40 is appropriately controlled even when the orientation of the recording magnetic field generated by at least one of the first magnetic pole 31 or the second magnetic pole 32 changes. Since the currents (first to third magnetic parts currents 41i to 43i of) to such a magnetic member 40, heat flows 41h to 43h and the like are appropriately generated. As a result, the heat of the magnetic element 20 can be efficiently discharged.

In the examples of the magnetic heads 110 to 113, a direction from the first magnetic part 41 to the magnetic element (second direction D2) is along the medium-facing surface 30F. For example, the first magnetic part 41 faces the side surface of the magnetic element 20. As described above, the first direction D1 is along the medium-facing surface 30F. For example, the absolute value of the angle between the first direction D1 and the medium-facing surface 30F is not more than 30 degrees (may be not more than 10). As described below, the first magnetic part 41 provided on the magnetic member 40 may be provided on the magnetic element 20.

Figure 7A:
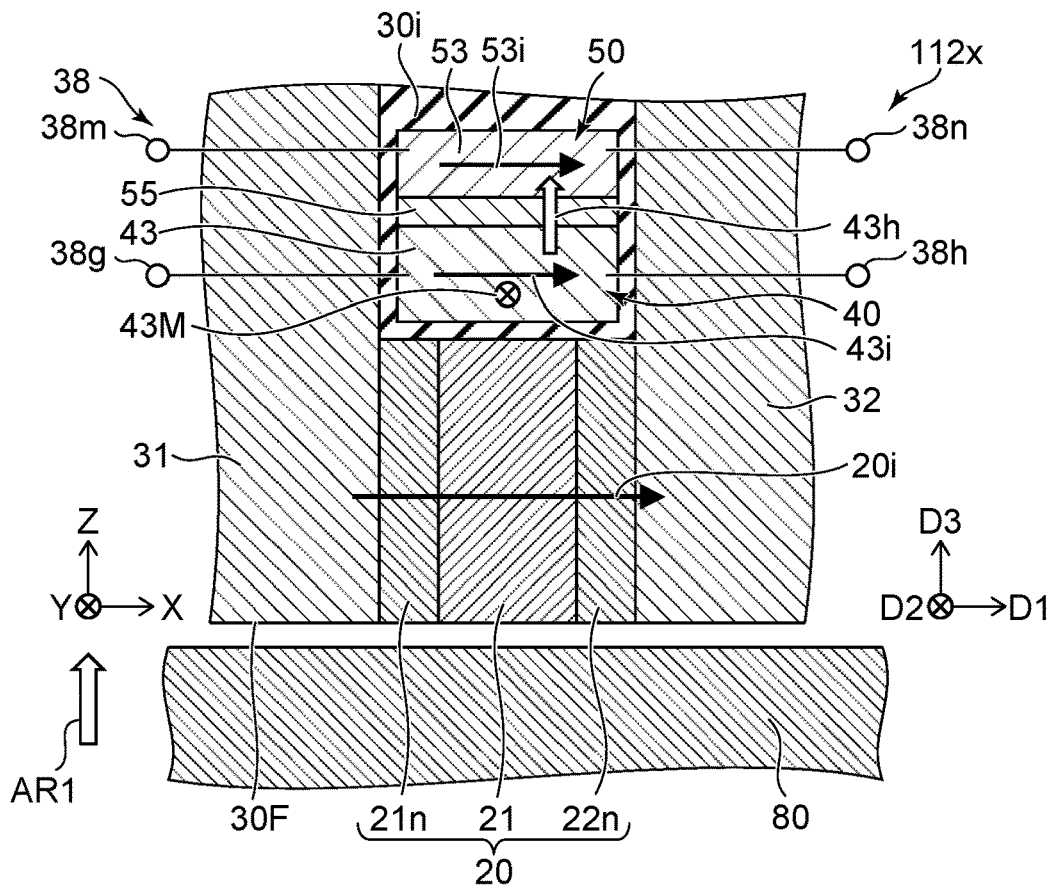
FIGS. 7A and 7B are schematic views illustrating a magnetic head according to the first embodiment.
Figure 7B:
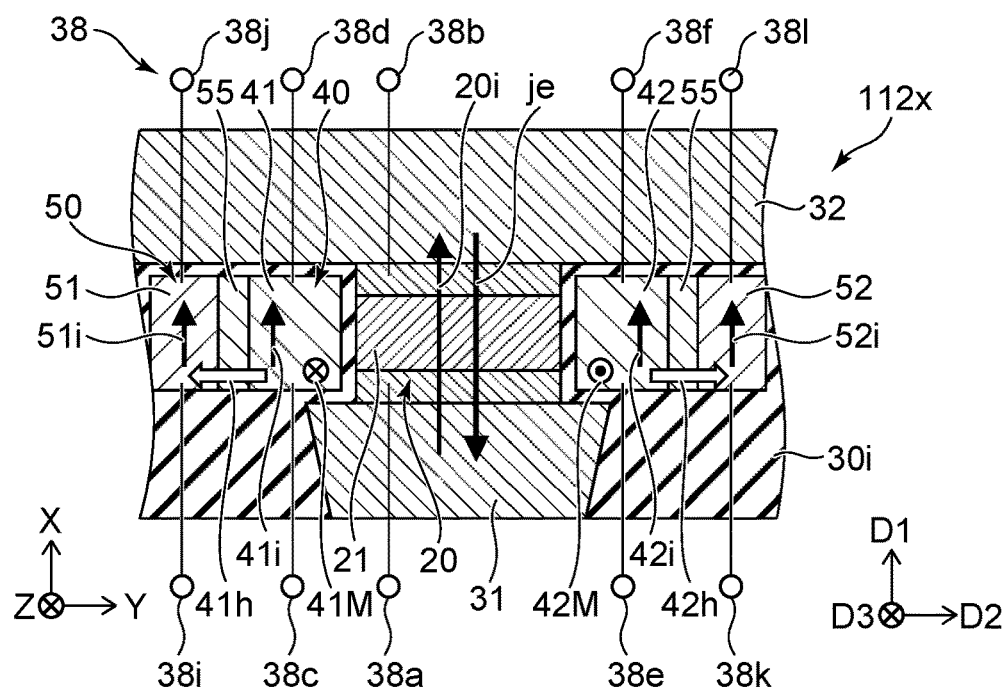

FIGS. 7A and 7B are schematic views illustrating a magnetic head according to the first embodiment.

FIG. 7A is a cross-sectional view. FIG. 7B is a plan view seen from the arrow AR1 of FIG. 7A.

As shown in FIGS. 7A and 7B, a magnetic head 112x according to the embodiment includes a non-magnetic member 55. Except for this, the configuration of the magnetic head 112x may be the same as the configuration of the magnetic head 112. The non-magnetic member 55 is provided between the magnetic member 40 and the conductive member 50. The non-magnetic member 55 may be in contact with the magnetic member 40 and the conductive member 50. The non-magnetic member 55 includes, for example, at least one selected from the group consisting of Cu, Au, Cr, Al, V and Ag. For example, the non-magnetic member 55 efficiently transmits spin-orbit torque between the magnetic member 40 and the conductive member 50.

Figure 8A:
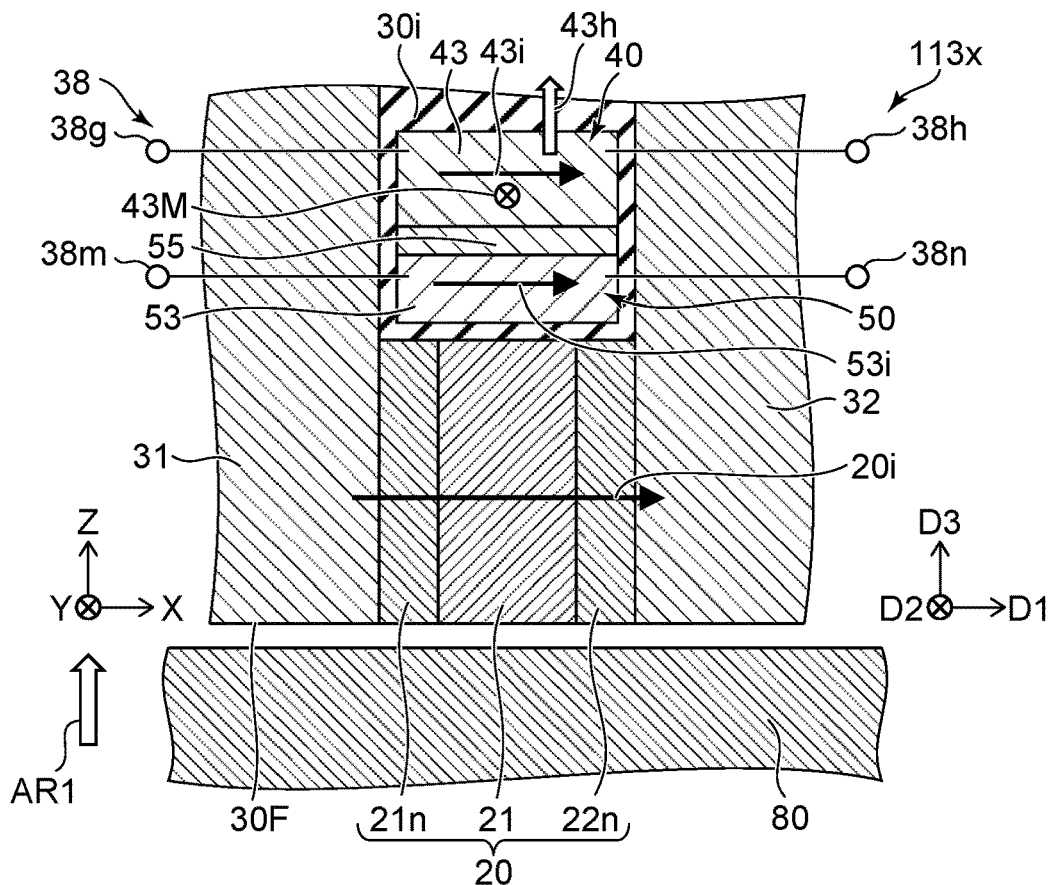
FIGS. 8A and 8B are schematic views illustrating a magnetic head according to the first embodiment.
Figure 8B:
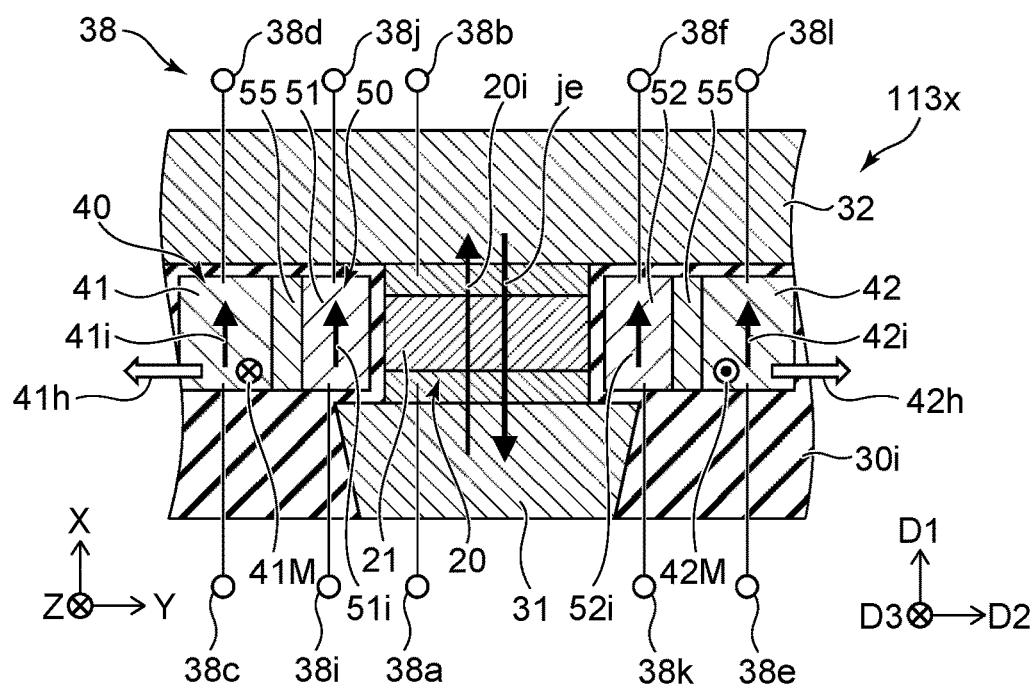

FIGS. 8A and 8B are schematic views illustrating a magnetic head according to the first embodiment.

FIG. 8A is a cross-sectional view. FIG. 8B is a plan view seen from the arrow AR1 of FIG. 8A.

As shown in FIGS. 8A and 8B, a magnetic head 113x according to the embodiment includes the non-magnetic member 55. Except for this, the configuration of the magnetic head 113x may be the same as the configuration of the magnetic head 113. The non-magnetic member 55 is provided between the magnetic member 40 and the conductive member 50. The non-magnetic member 55 may be in contact with the magnetic member 40 and the conductive member 50. The non-magnetic member 55 includes, for example, at least one selected from the group consisting of Cu, Au, Cr, Al, V and Ag. For example, the non-magnetic member 55 efficiently transmits spin-orbit torque between the magnetic member 40 and the conductive member 50.

Figure 9A:
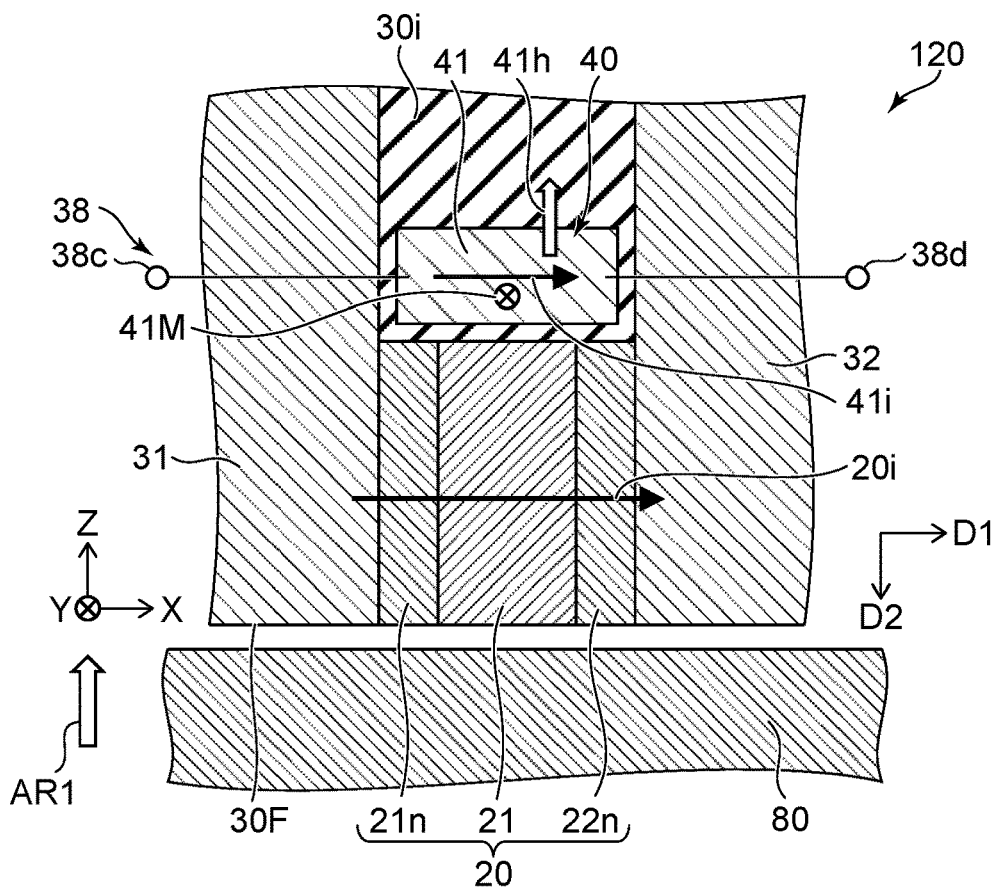
FIGS. 9A and 9B are schematic views illustrating a magnetic head according to the first embodiment.
Figure 9B:
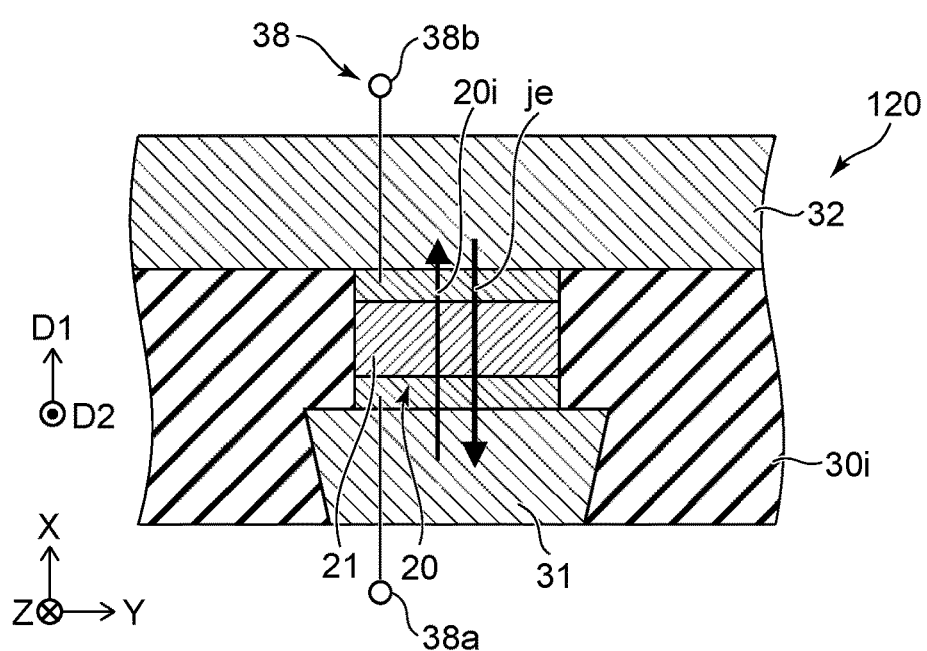

FIGS. 9A and 9B are schematic views illustrating a magnetic head according to the first embodiment.

FIG. 9A is a cross-sectional view. FIG. 9B is a plan view seen from the arrow AR1 of FIG. 9A.

As shown in FIGS. 9A and 9B, in a magnetic head 120 according to the embodiment, the magnetic member 40 includes the first magnetic portion 41. The second direction D2 from the first magnetic portion 41 to the magnetic element 20 crosses the medium-facing surface 30F. Other than this, the configuration of the magnetic head 120 may be the same as the configuration of the magnetic head 110.

For example, at least one of the terminal 38c or the terminal 38d may be omitted, and the first magnetic part current 41i may be supplied via the terminals 38a and 38b (for example, the first terminal T1 and the second terminal T2).

Figure 10A:
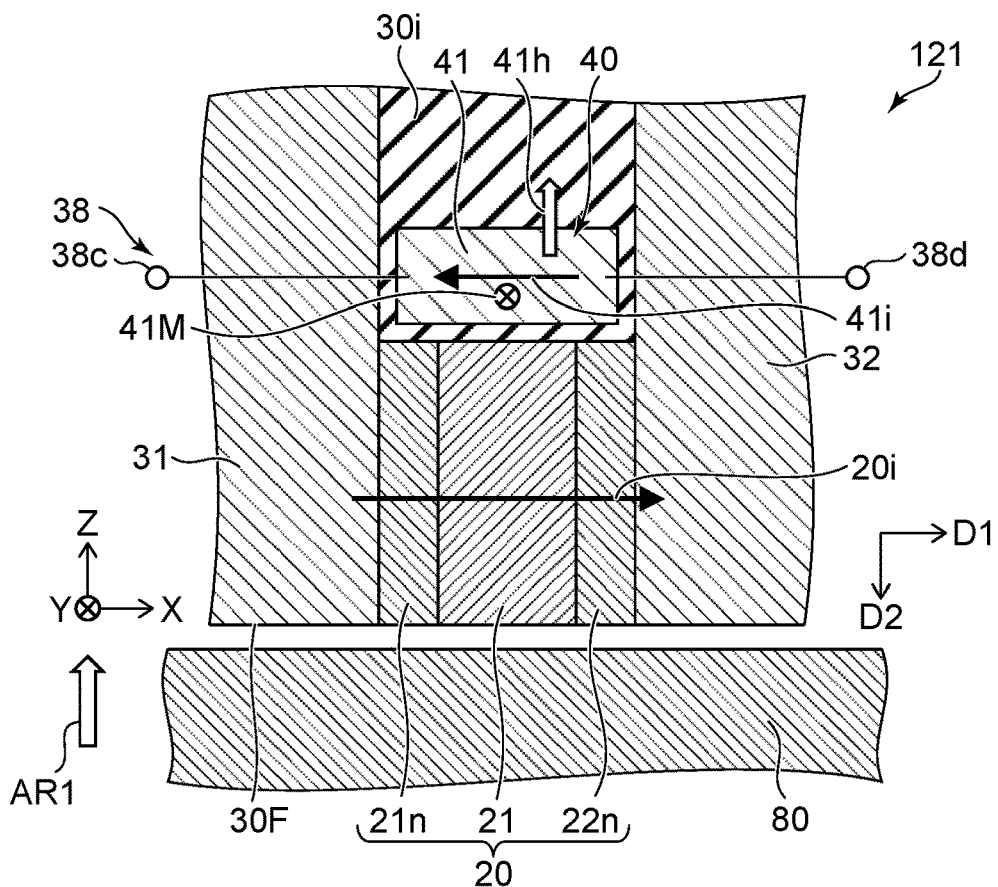
FIGS. 10A and 10B are schematic views illustrating a magnetic head according to the first embodiment.
Figure 10B:
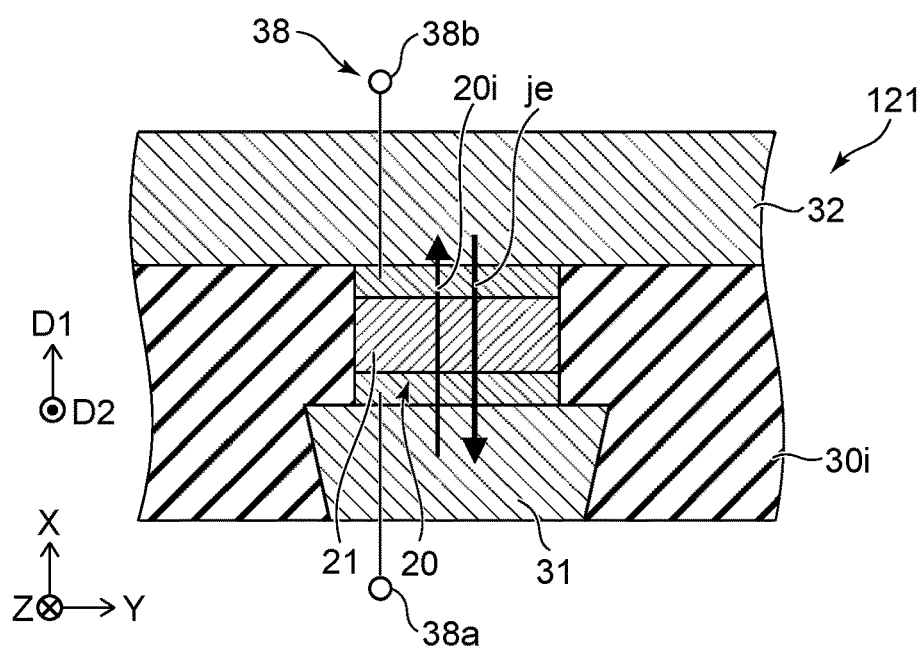

FIGS. 10A and 10B are schematic views illustrating a magnetic head according to the first embodiment.

FIG. 10A is a cross-sectional view. FIG. 10B is a plan view seen from the arrow AR1 of FIG. 10A.

As shown in FIGS. 10A and 10B, also in a magnetic head 121 according to the embodiment, the second direction D2 from the first magnetic part 41 to the magnetic element 20 crosses the medium-facing surface 30F. Other than this, the configuration of the magnetic head 121 may be the same as the configuration of the magnetic head 111. In the magnetic head 121, the orientation of the first magnetic part current 41i is opposite to the orientation of the element current 20i.

Figure 11A:
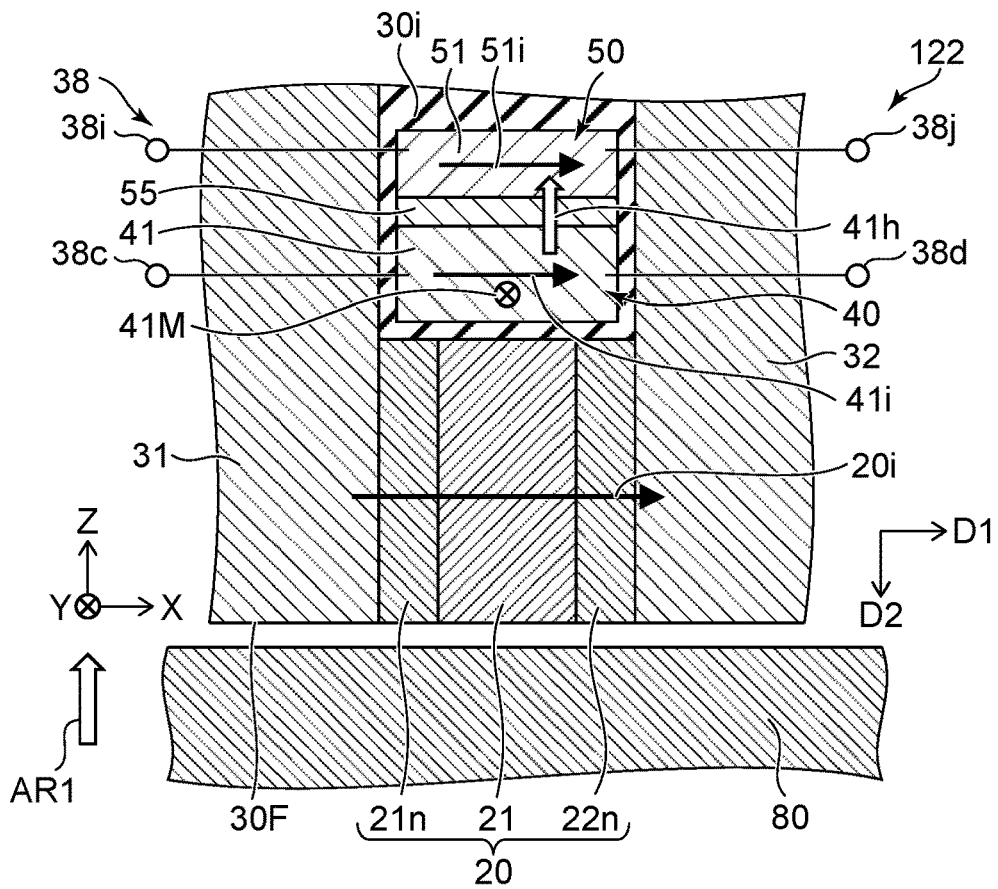
FIGS. 11A and 11B are schematic views illustrating a magnetic head according to the first embodiment.
Figure 11B:
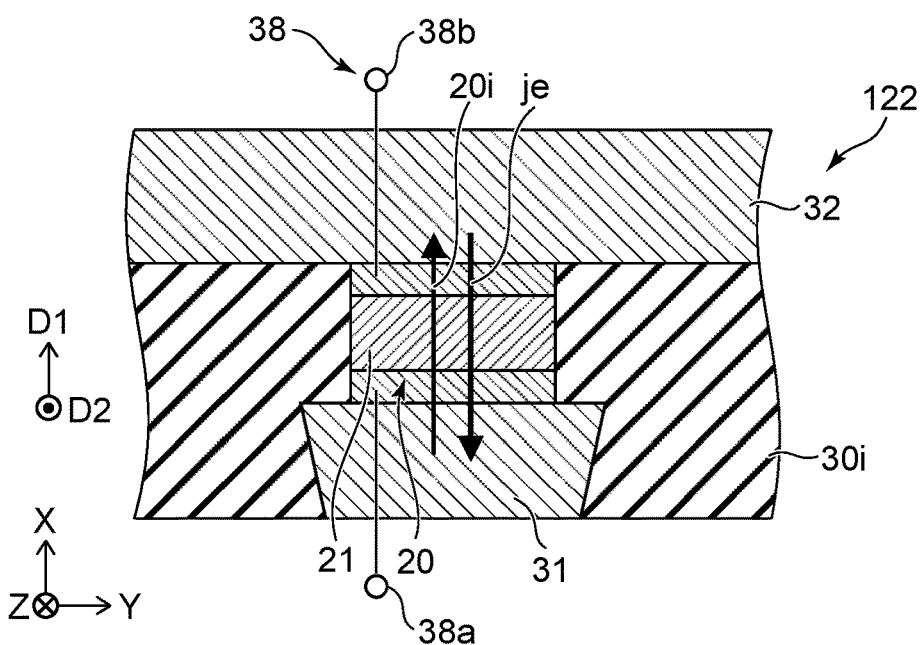

FIGS. 11A and 11B are schematic views illustrating a magnetic head according to the first embodiment.

FIG. 11A is a cross-sectional view. FIG. 11B is a plan view seen from the arrow AR1 of FIG. 11A.

As shown in FIGS. 11A and 11B, also in a magnetic head 122 according to the embodiment, the second direction D2 from the first magnetic part 41 to the magnetic element 20 crosses the medium-facing surface 30F. Other than this, the configuration of the magnetic head 122 may be the same as the configuration of the magnetic head 112.

Figure 12A:
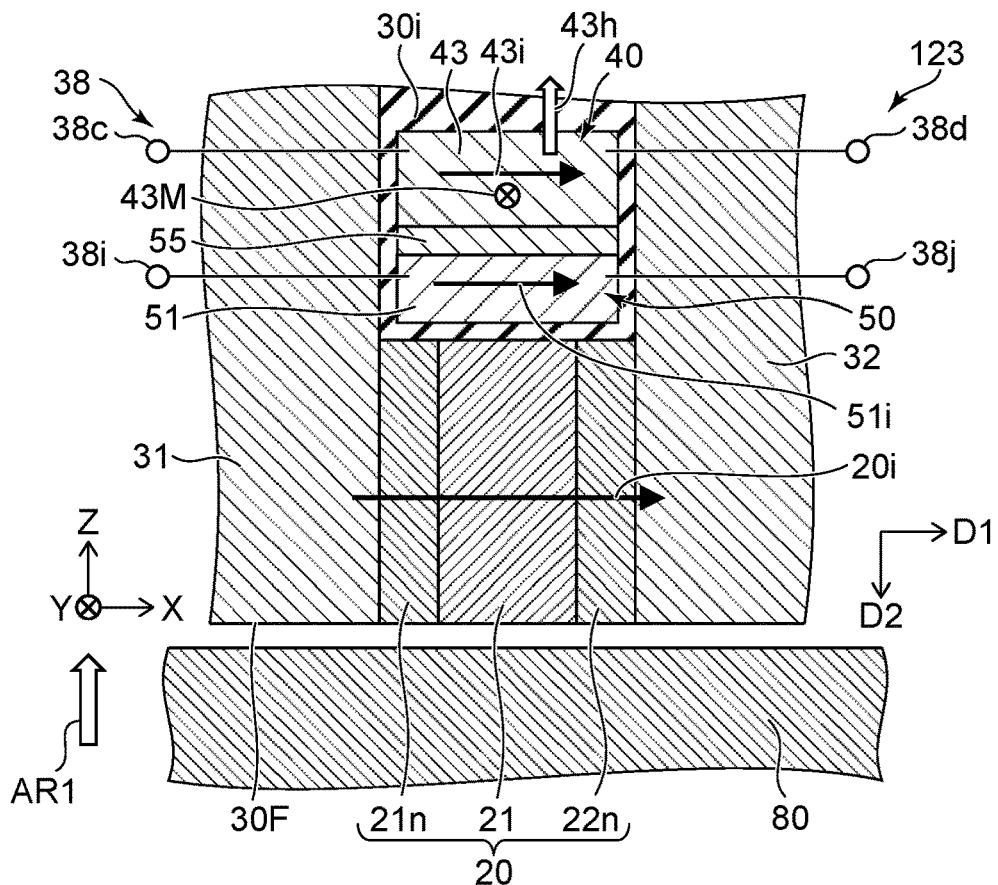
FIGS. 12A and 12B are schematic views illustrating a magnetic head according to the first embodiment.
Figure 12B:
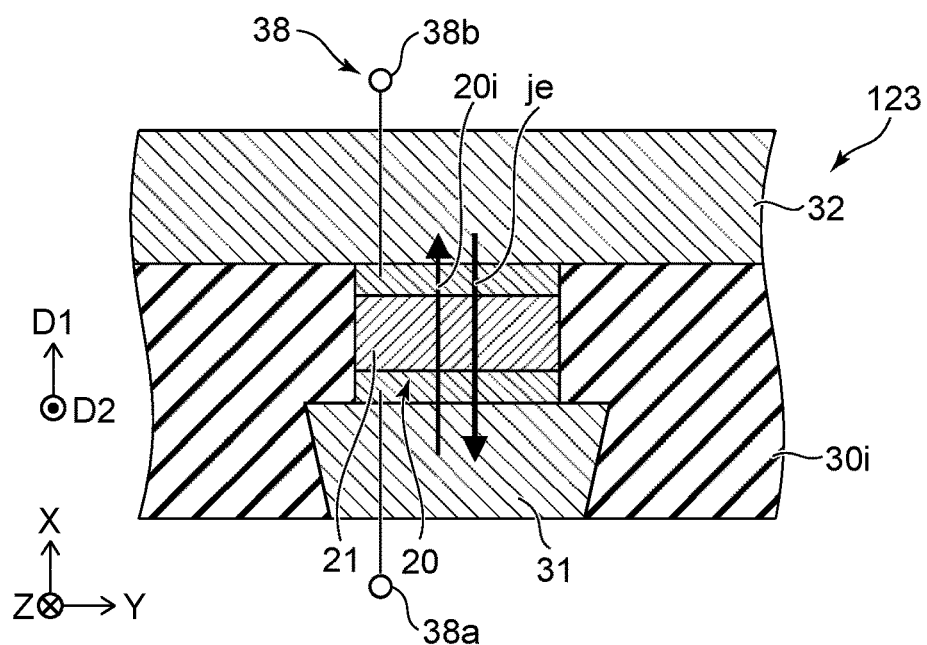

FIGS. 12A and 12B are schematic views illustrating a magnetic head according to the first embodiment.

FIG. 12A is a cross-sectional view. FIG. 12B is a plan view seen from the arrow AR1 of FIG. 12A.

As shown in FIGS. 12A and 12B, also in a magnetic head 123 according to the embodiment, the second direction D2 from the first magnetic part 41 to the magnetic element 20 crosses the medium-facing surface 30F. Other than this, the configuration of the magnetic head 123 may be the same as the configuration of the magnetic head 113.

In the magnetic heads 121 and 123, the non-magnetic member 55 may be omitted, and the conductive member 50 may be into contact with the magnetic member 40. In the magnetic heads 120 to 123, the first direction D1 is along the medium-facing surface 30F. The absolute value of the angle between the first direction D1 and the medium-facing surface 30F is not more than 30 degrees.

FIGS. 13A, 13B, 14A, 14B, 15A, 15B, 16A, 16B, 17A, 17B, 18A, 18B, 19A, 19B, 20A, 20B, 21A, 21B, 22A, and 22B are schematic views illustrating magnetic heads according to the first embodiment.

FIGS. 13A to 22A are cross-sectional views. FIGS. 13B to 22B are plan views seen from the arrow AR1 of FIGS. 13A to 22A, respectively.

Figure 13A:
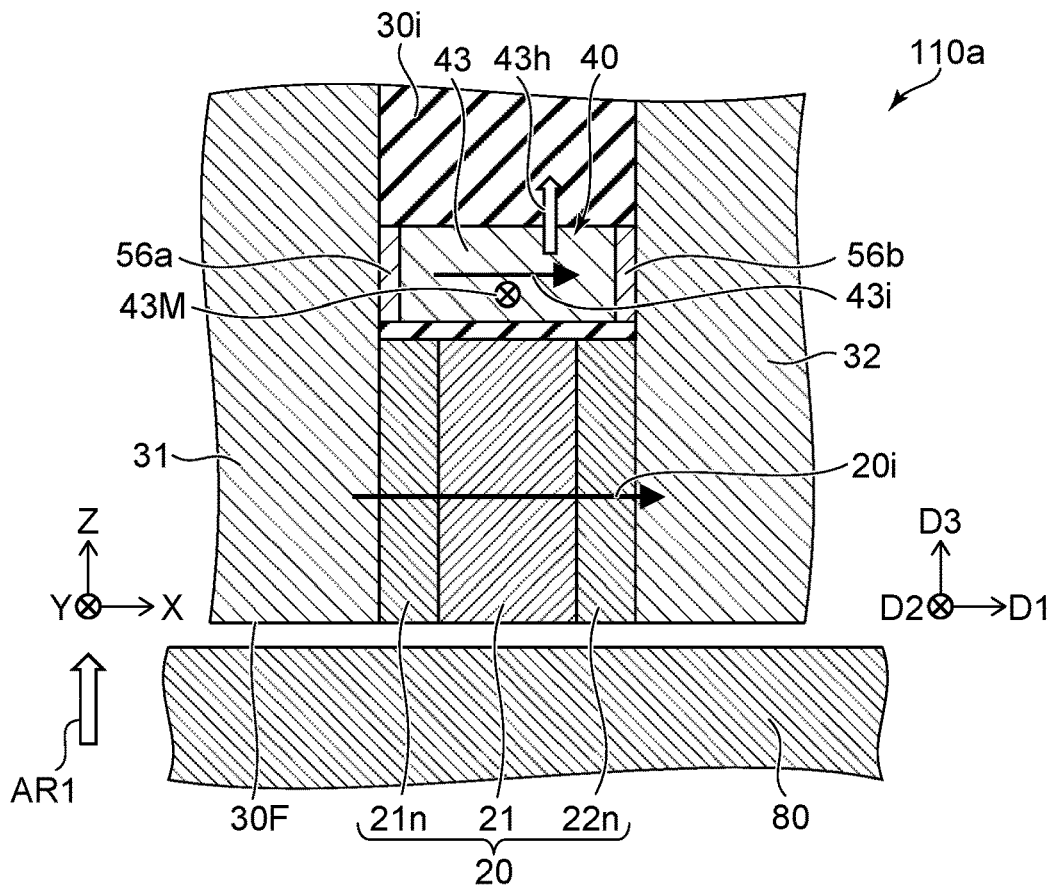
FIGS. 13A and 13B are schematic views illustrating a magnetic head according to the first embodiment.
Figure 13B:
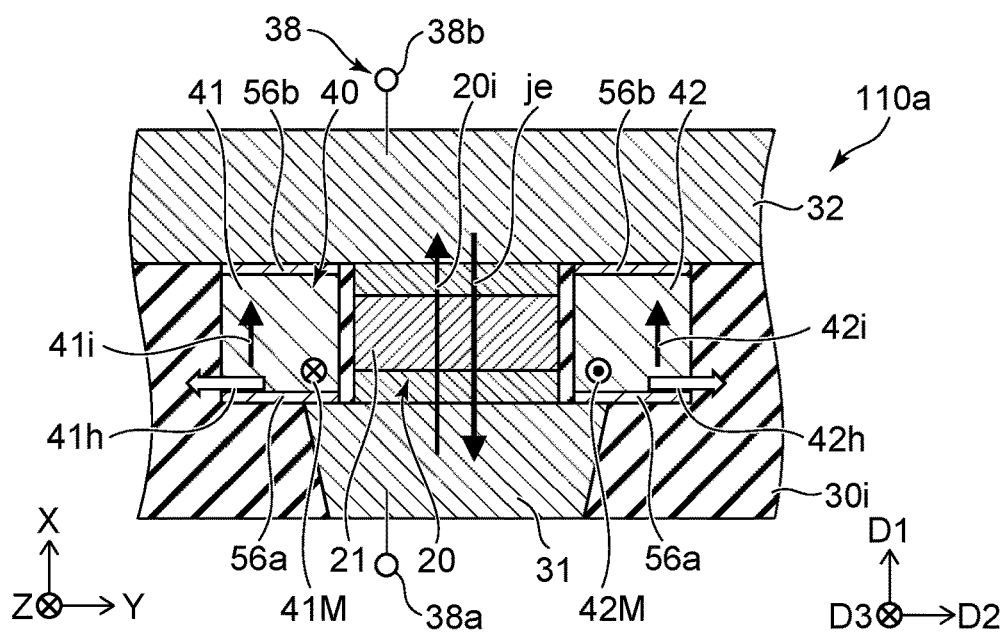

In a magnetic head 110a according to the embodiment illustrated in FIGS. 13A and 13B, the first to third magnetic parts 41 to 43 are continuous with each other. One end of the magnetic element 20 is electrically connected to the first magnetic pole 31. The other end of the magnetic element 20 is electrically connected to the second magnetic pole 32. One end of the magnetic member 40 (first to third magnetic parts 41 to 43) is electrically connected to the first magnetic pole 31. The other end of the magnetic member 40 (first to third magnetic parts 41 to 43) is electrically connected to the second magnetic pole 32. In this example, the terminal 38a is electrically connected to the first magnetic pole 31. The terminal 38b is electrically connected to the second magnetic pole 32. The element current 20i and the first to third magnetic part currents 41i to 43i are supplied through these terminals. At least one of the non-magnetic member 56a or the non-magnetic member 56b may be provided in the magnetic head 110a. At least a part of the non-magnetic member 56a is provided between the first magnetic pole 31 and the magnetic member 40. At least a part of the non-magnetic member 56b is provided between the magnetic member 40 and the second magnetic pole 32. At least one of the non-magnetic member 56a or the non-magnetic member 56b includes, for example, a metal or the like.

Figure 14A:
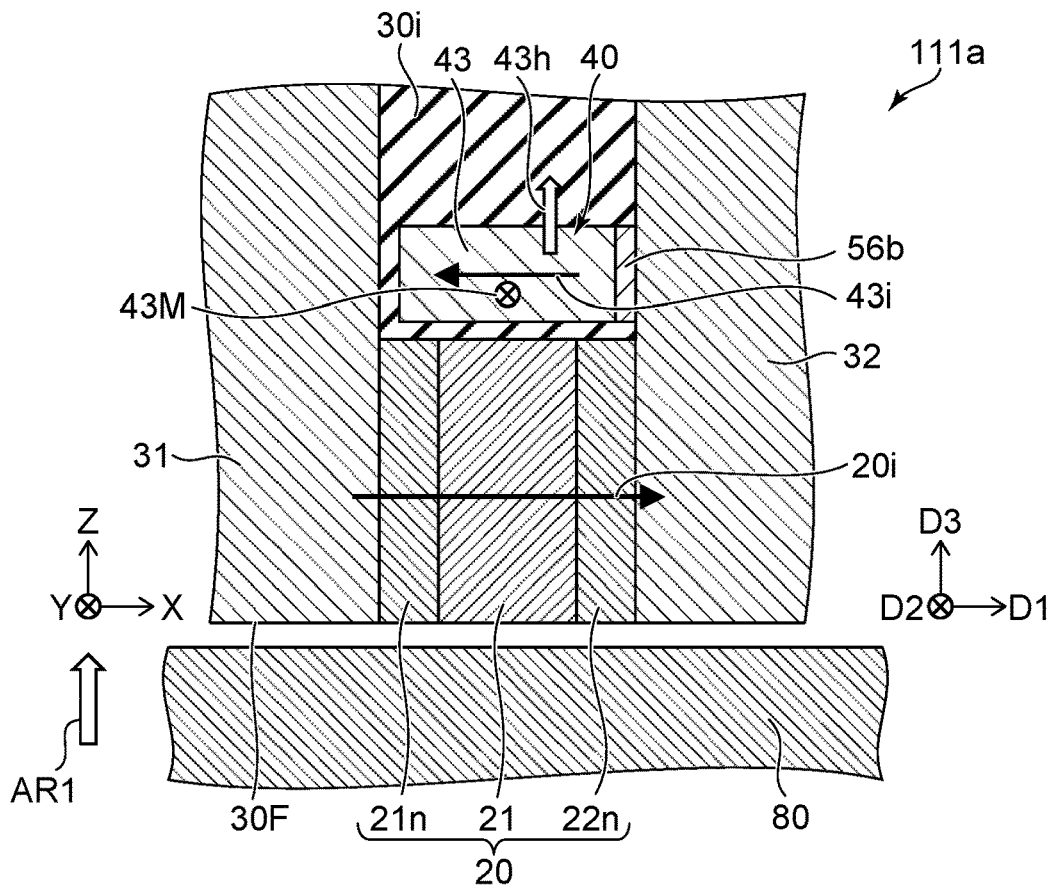
FIGS. 14A and 14B are schematic views illustrating a magnetic head according to the first embodiment.
Figure 14B:
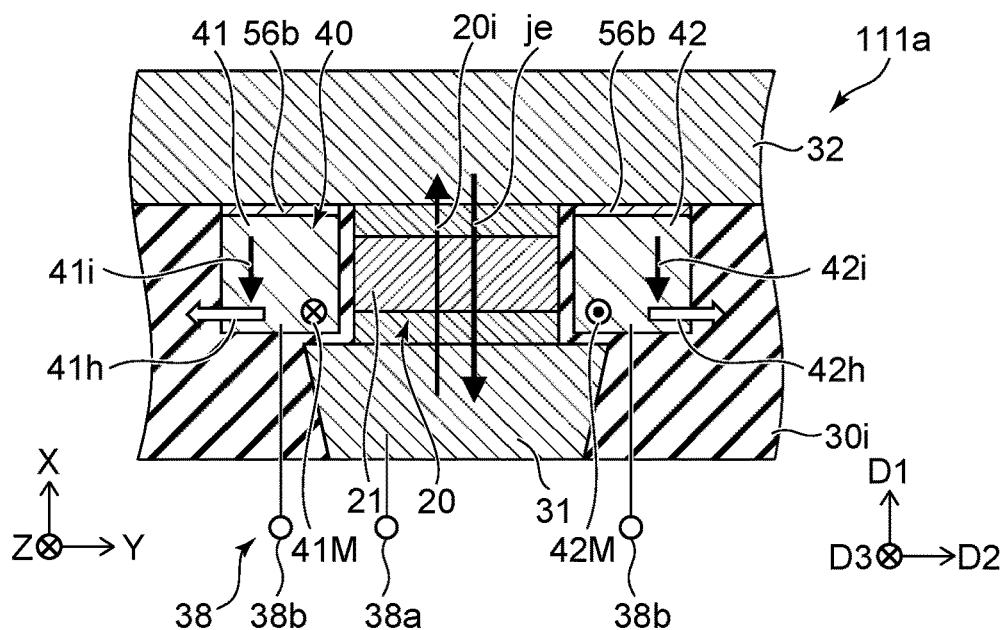

In a magnetic head 111a according to the embodiment illustrated in FIGS. 14A and 14B, the first to third magnetic parts 41 to 43 are continuous with each other. One end of the magnetic element 20 is electrically connected to the first magnetic pole 31. The other end of the magnetic element 20 is electrically connected to the second magnetic pole 32. One end of the magnetic member 40 (first to third magnetic parts 41 to 43) is electrically connected to the second magnetic pole 32. The terminal 38a is electrically connected to the first magnetic pole 31. The terminal 38b is electrically connected to the other end of the magnetic member 40. The element current 20i and the first to third magnetic part currents 41i to 43i are supplied through these terminals.

Figure 15A:
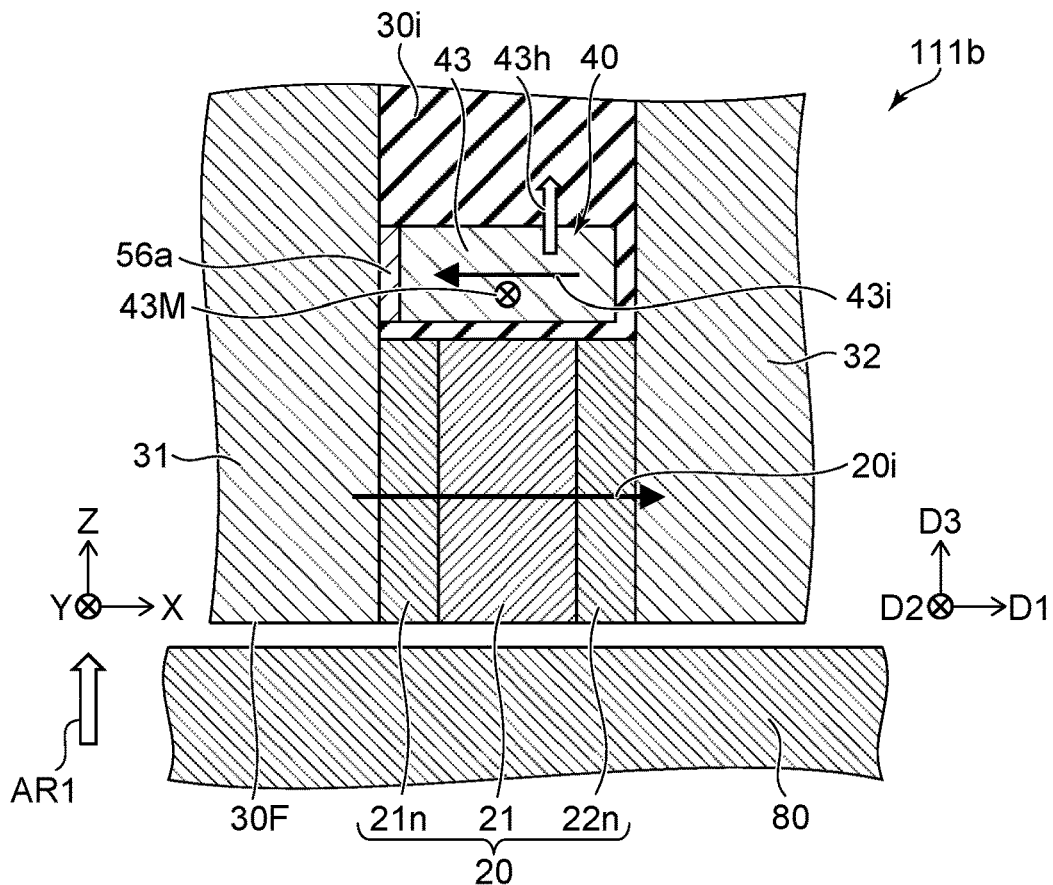
FIGS. 15A and 15B are schematic views illustrating a magnetic head according to the first embodiment.
Figure 15B:
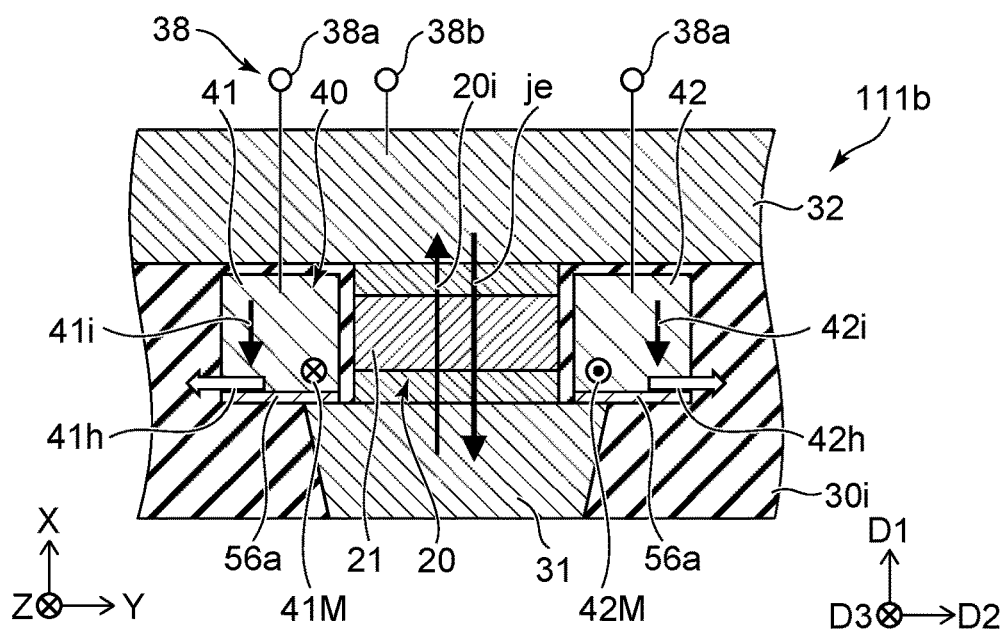
Figure 16A:
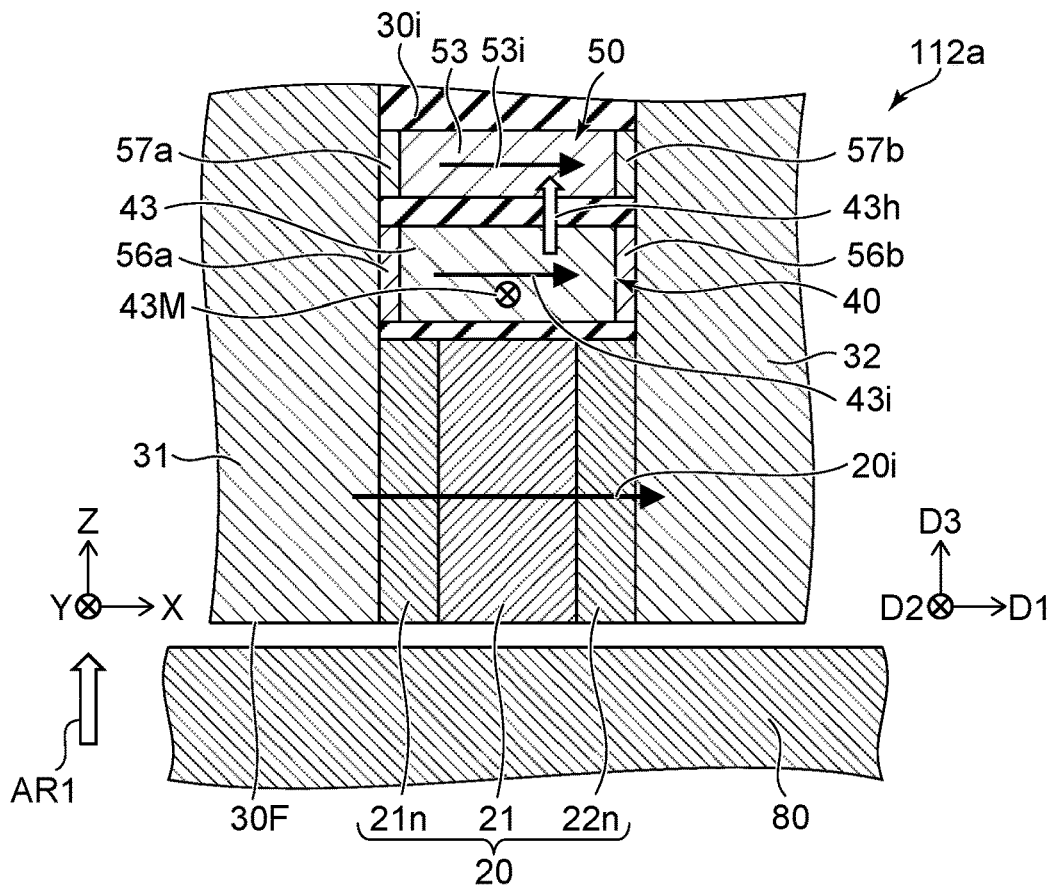
FIGS. 16A and 16B are schematic views illustrating a magnetic head according to the first embodiment.
Figure 16B:
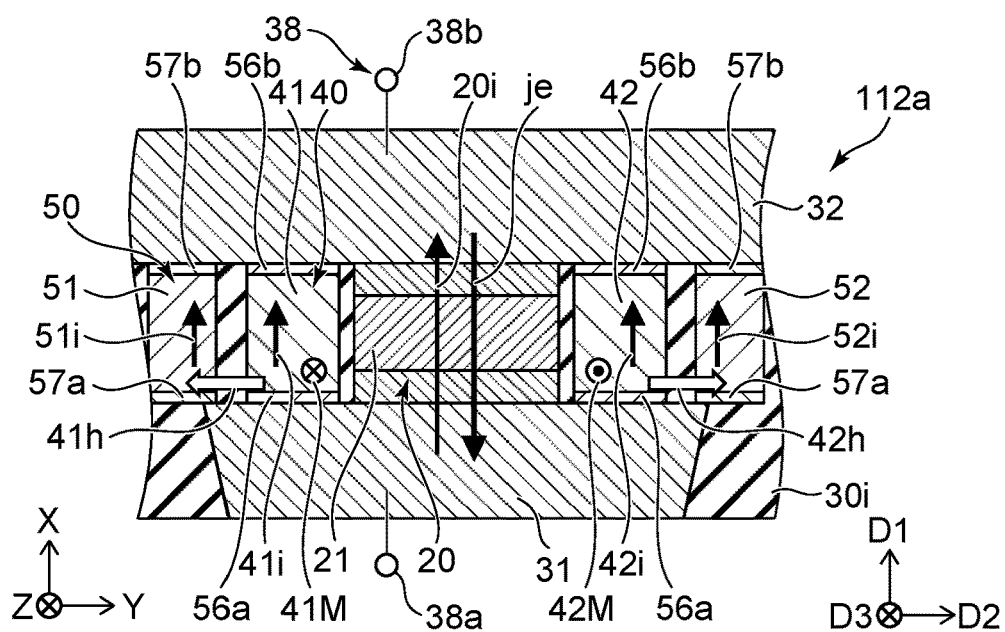
Figure 17A:
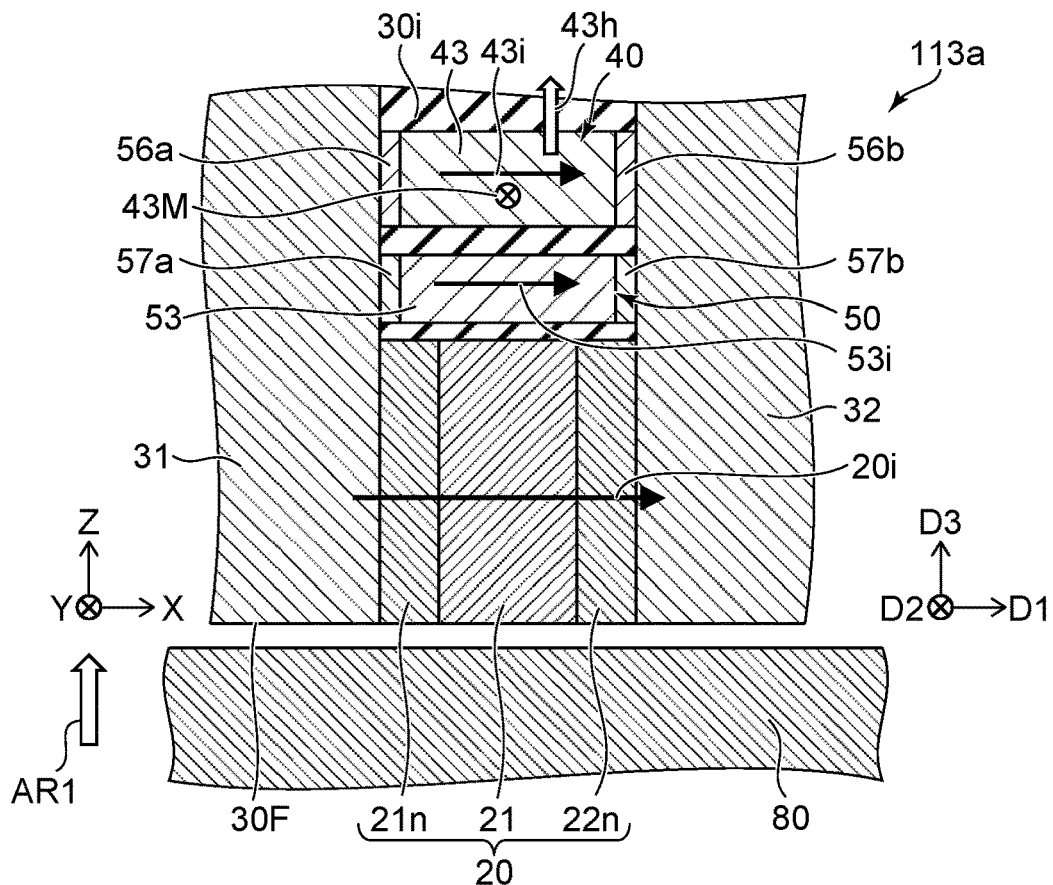
FIGS. 17A and 17B are schematic views illustrating a magnetic head according to the first embodiment.
Figure 17B:
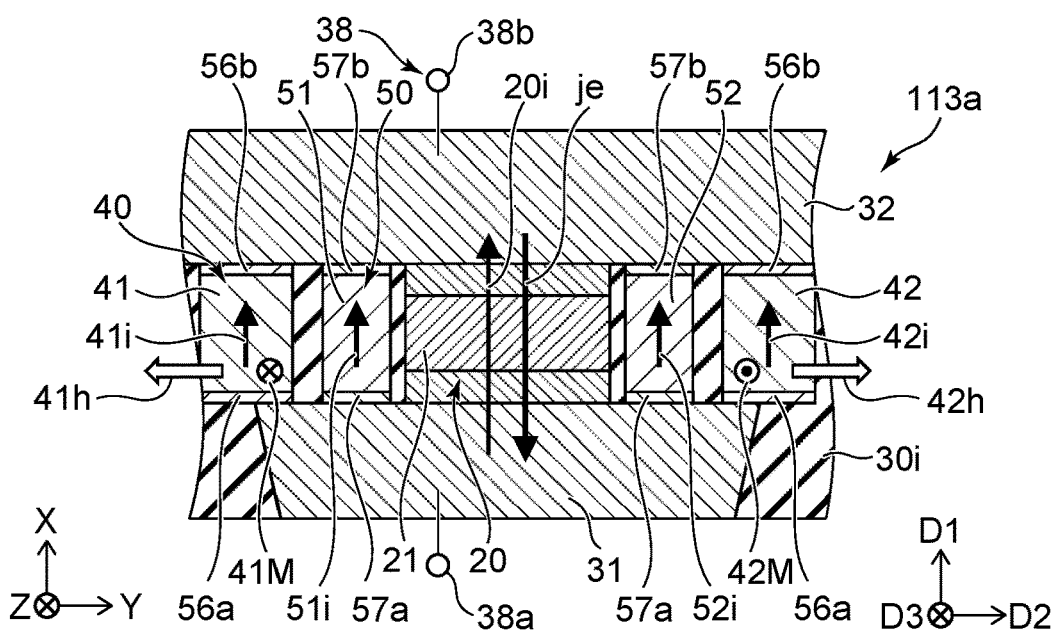

In a magnetic head 111b according to the embodiment illustrated in FIGS. 15A and 15B, the first to third magnetic parts 41 to 43 are continuous with each other. One end of the magnetic element 20 is electrically connected to the first magnetic pole 31. The other end of the magnetic element 20 is electrically connected to the second magnetic pole 32. One end of the magnetic member 40 (first to third magnetic parts 41 to 43) is electrically connected to the first magnetic pole 31. The terminal 38b is electrically connected to the second magnetic pole 32. The terminal 38a is electrically connected to the other end of the magnetic member 40. The element current 20i and the first to third magnetic part currents 41i to 43i are supplied through these terminals.

In a magnetic heads 112a and 113a according to the embodiments illustrated in FIGS. 16A, 16B, 17A and 17B, the first to third magnetic parts 41 to 43 are continuous with each other. One end of the magnetic element 20 is electrically connected to the first magnetic pole 31. The other end of the magnetic element 20 is electrically connected to the second magnetic pole 32. One end of the magnetic member 40 (first to third magnetic parts 41 to 43) is electrically connected to the first magnetic pole 31. The other end of the magnetic member 40 (first to third magnetic parts 41 to 43) is electrically connected to the second magnetic pole 32. One end of the conductive member 50 (first to third conductive parts 51 to 53) is electrically connected to the first magnetic pole 31. The other end of the conductive member 50 (first to third conductive parts 51 to 53) is electrically connected to the first magnetic pole 31. The terminal 38a is electrically connected to the first magnetic pole 31. The terminal 38b is electrically connected to the second magnetic pole 32. The element current 20i, the first to third magnetic part currents 41i to 43i, and the first to third conductive part currents 51i to 53i are supplied through these terminals.

At least one of the above-mentioned non-magnetic member 56a or non-magnetic member 56b may be provided in the magnetic heads 112a and 113a. At least one of the non-magnetic member 57a or the non-magnetic member 57b may be provided in the magnetic heads 112a and 113a. At least a part of the non-magnetic member 57a is provided between the first magnetic pole 31 and the conductive member 50. At least a part of the non-magnetic member 57b is provided between the conductive member 50 and the second magnetic pole 32. At least one of the non-magnetic member 57a or the non-magnetic member 57b includes at least one selected from the group consisting of, for example, Cu, Au, Cr, Al, V, Ag, Ru, Ir, Ta, Rh, Pd, Pt and W and the like. The non-magnetic member 57a and the non-magnetic member 57b may include any conductive material.

Figure 18A:
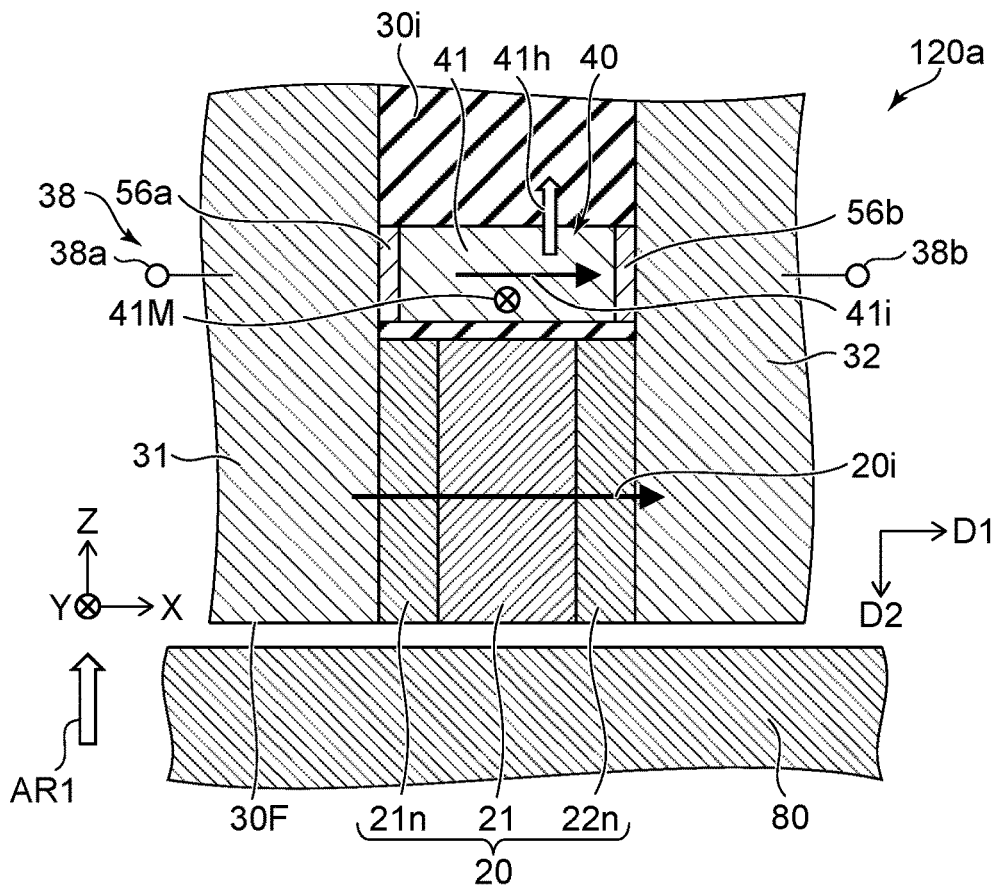
FIGS. 18A and 18B are schematic views illustrating a magnetic head according to the first embodiment.
Figure 18B:
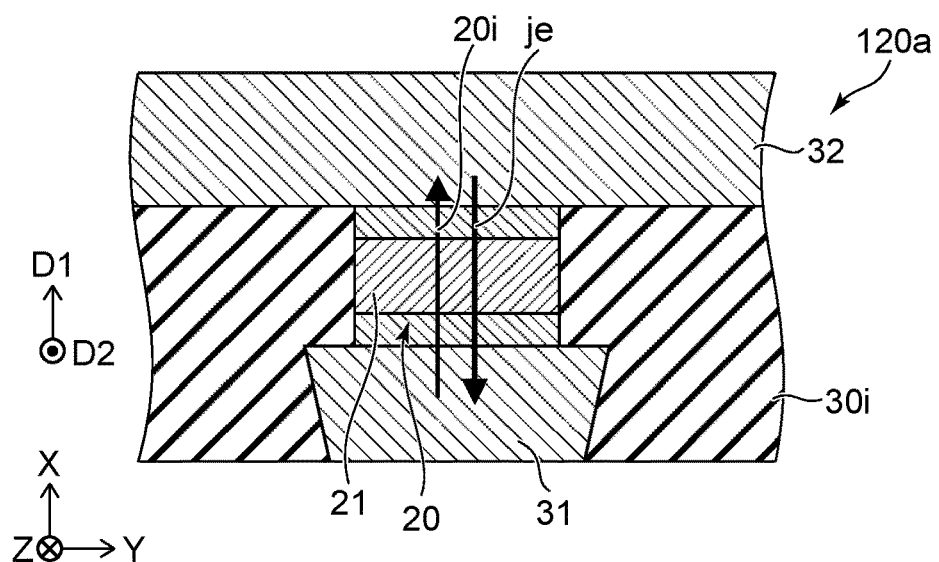

In a magnetic head 120a according to the embodiment illustrated in FIGS. 18A and 18B, one end of the magnetic element 20 is electrically connected to the first magnetic pole 31. The other end of the magnetic element 20 is electrically connected to the second magnetic pole 32. One end of the first magnetic part 41 is electrically connected to the first magnetic pole 31. The other end of the first magnetic part 41 is electrically connected to the second magnetic pole 32. In this example, the terminal 38a is electrically connected to the first magnetic pole 31. The terminal 38b is electrically connected to the second magnetic pole 32. The element current 20i and the first to third magnetic part currents 41i to 43i are supplied through these terminals.

Figure 19A:
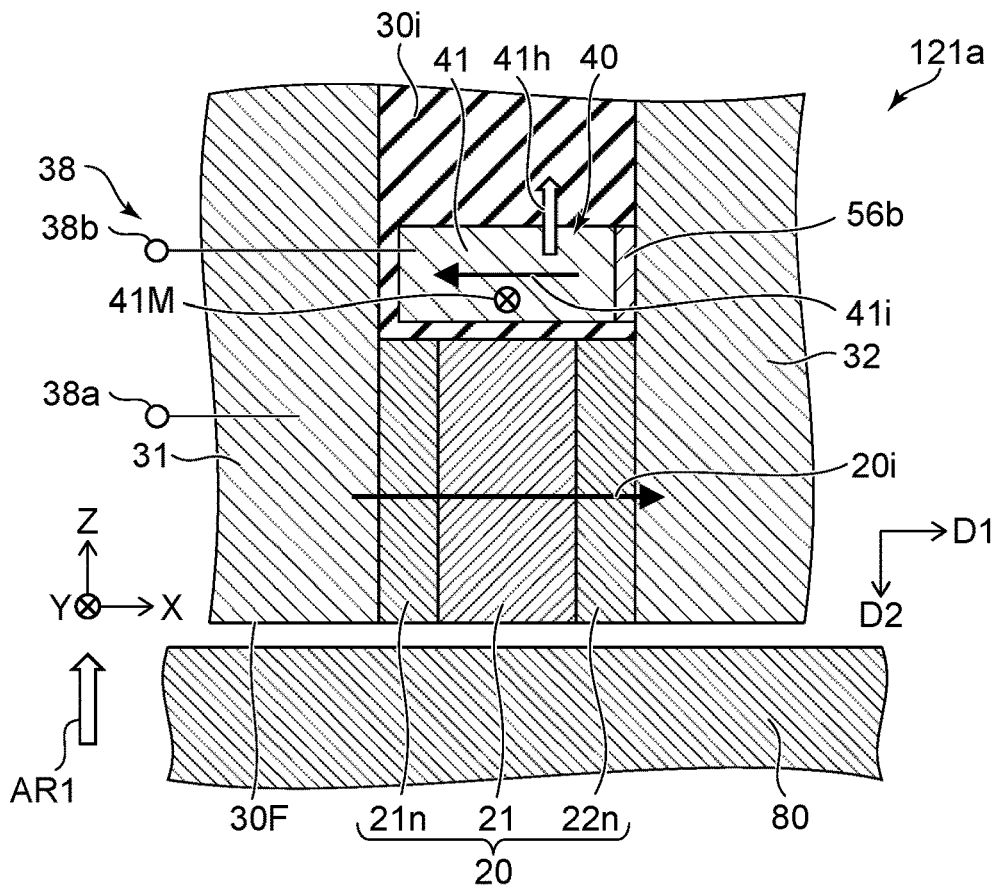
FIGS. 19A and 19B are schematic views illustrating a magnetic head according to the first embodiment.
Figure 19B:
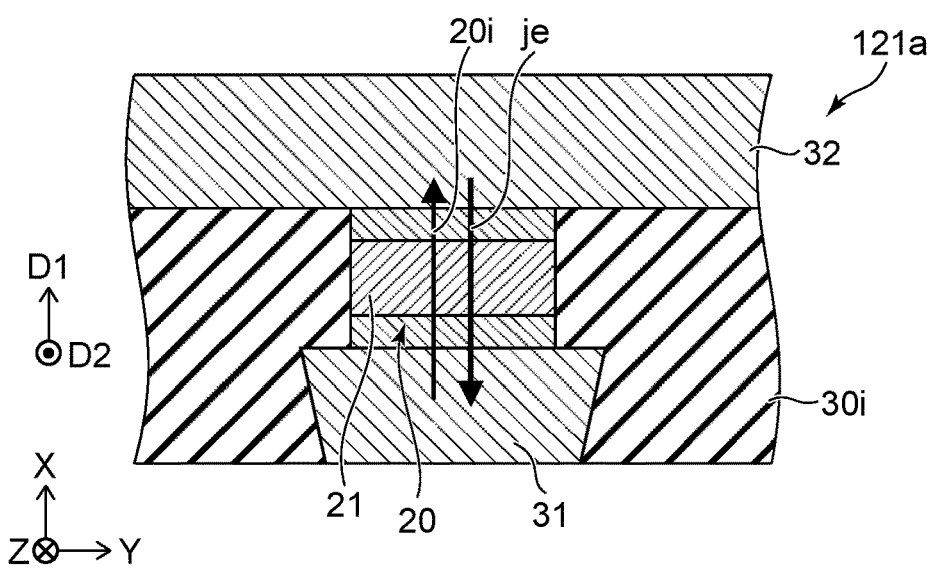

In a magnetic head 121a according to the embodiment illustrated in FIGS. 19A and 19B, one end of the magnetic element 20 is electrically connected to the first magnetic pole 31. The other end of the magnetic element 20 is electrically connected to the second magnetic pole 32. One end of the first magnetic part 41 is electrically connected to the second magnetic pole 32. In this example, the terminal 38a is electrically connected to the first magnetic pole 31. The terminal 38b is electrically connected to the other end of the first magnetic part 41. The element current 20i and the first magnetic part current 41i are supplied through these terminals.

Figure 20A:
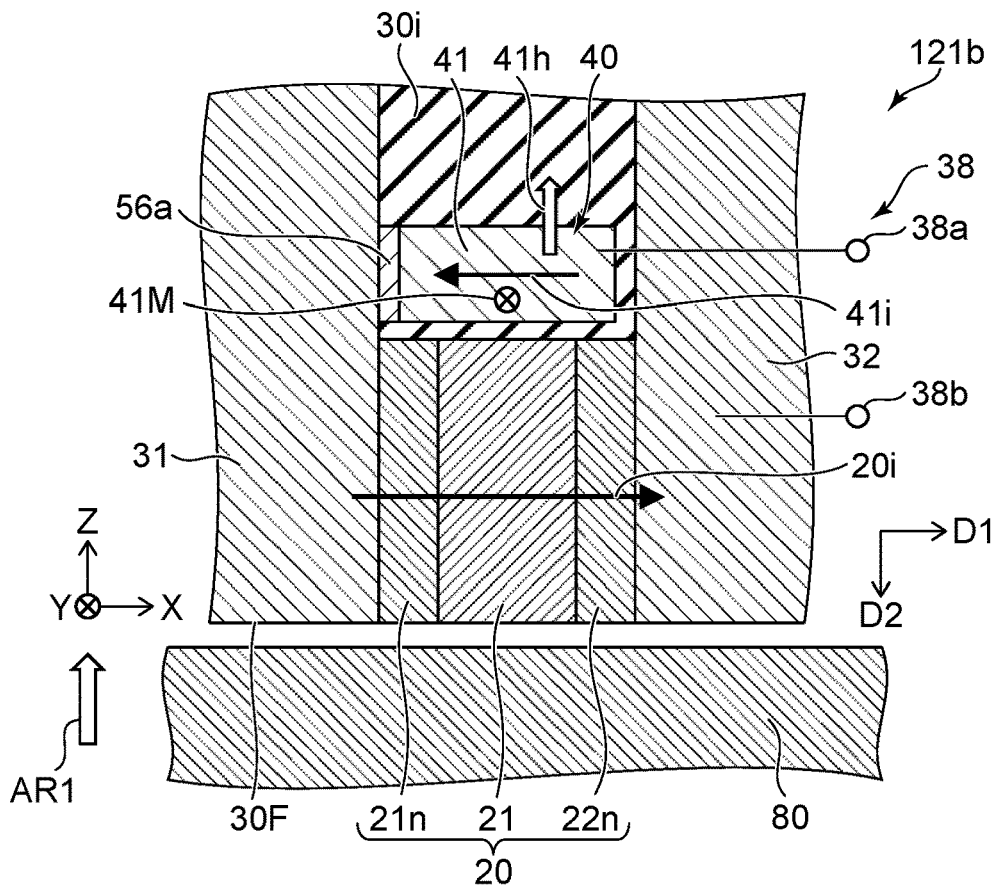
FIGS. 20A and 20B are schematic views illustrating a magnetic head according to the first embodiment.
Figure 20B:
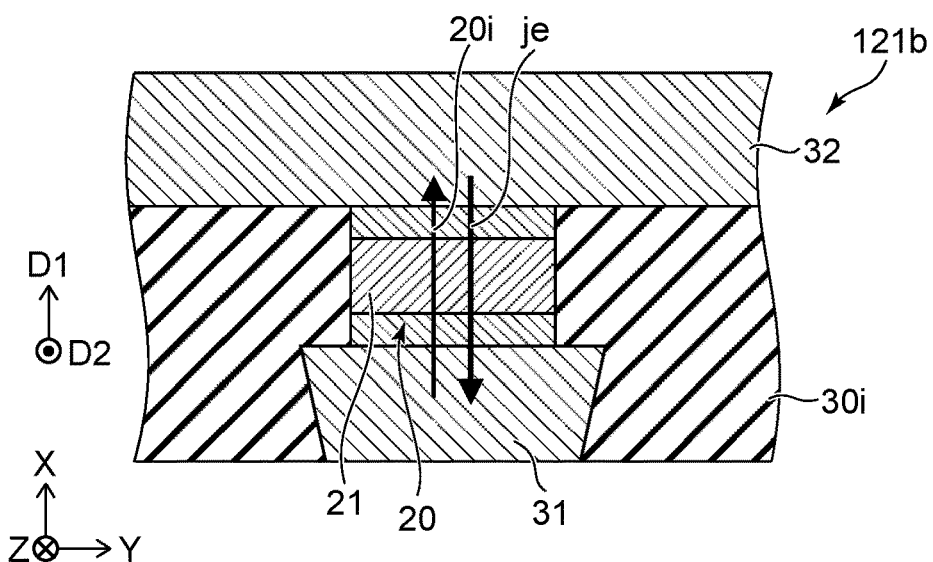
Figure 21A:
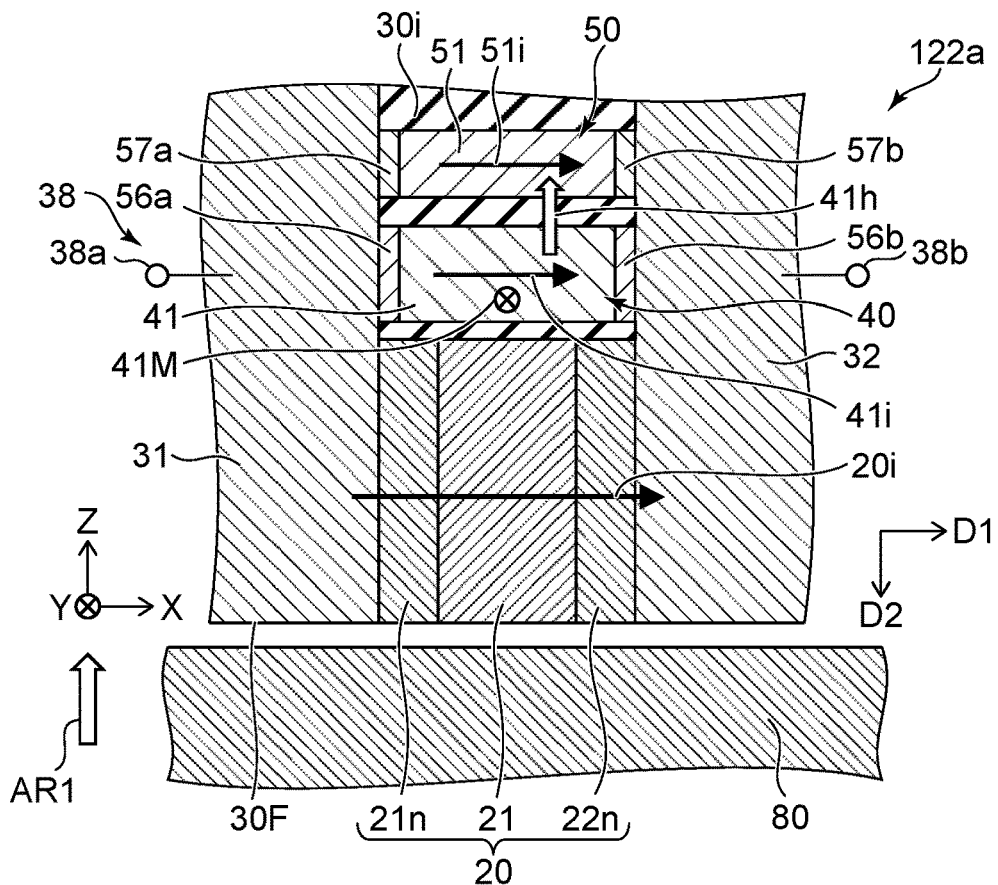
FIGS. 21A and 21B are schematic views illustrating a magnetic head according to the first embodiment.
Figure 21B:
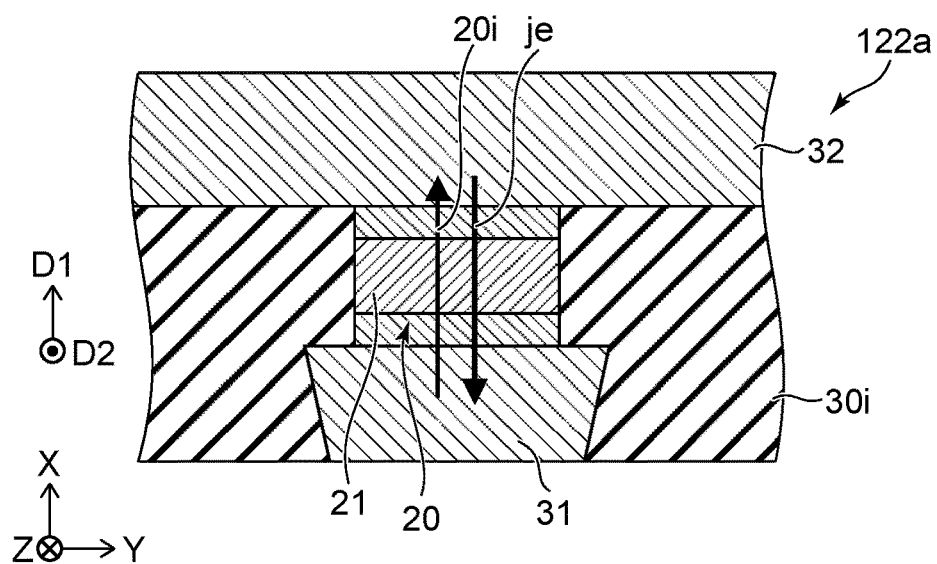
Figure 22A:
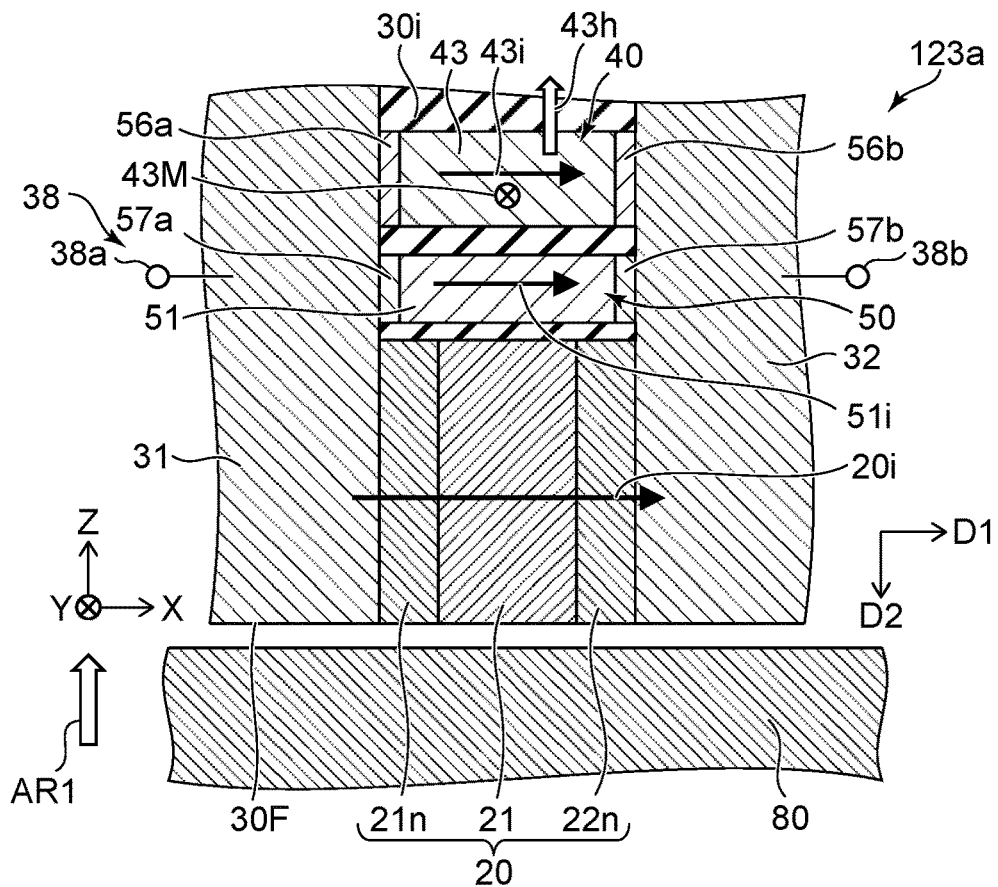
FIGS. 22A and 22B are schematic views illustrating a magnetic head according to the first embodiment.
Figure 22B:
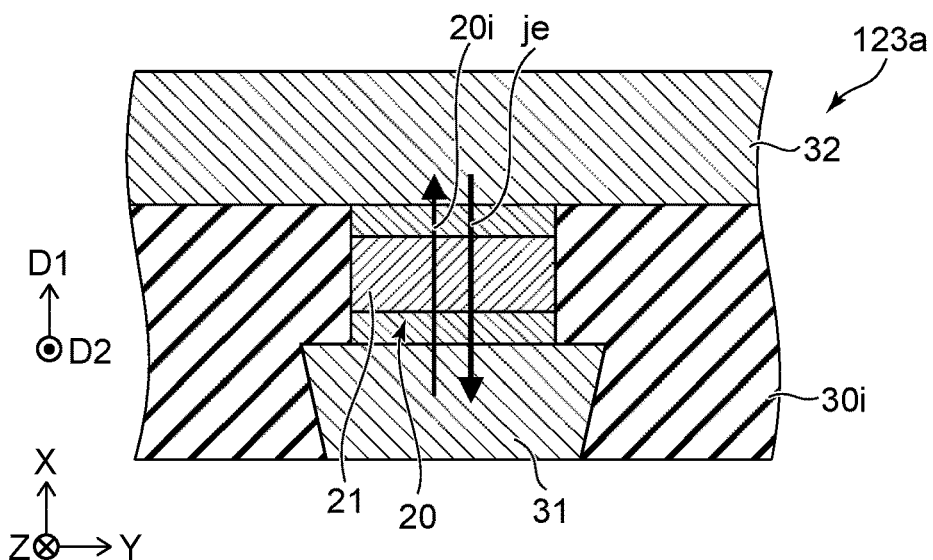

In a magnetic head 121b according to the embodiment illustrated in FIGS. 20A and 20B, one end of the magnetic element 20 is electrically connected to the first magnetic pole 31. The other end of the magnetic element 20 is electrically connected to the second magnetic pole 32. One end of the first magnetic part 41 is electrically connected to the first magnetic pole 31. In this example, the terminal 38a is electrically connected to the other end of the magnetic member 40. The terminal 38b is electrically connected to the first magnetic pole 32. The element current 20i and the first magnetic part current 41i are supplied through these terminals.

In magnetic heads 122a and 123a according to the embodiments illustrated in FIGS. 21A, 21B, 22A and 22B, one end of the magnetic element 20 is electrically connected to the first magnetic pole 31. The other end of the magnetic element is electrically connected to the second magnetic pole 32. One end of the first magnetic part 41 is electrically connected to the first magnetic pole 31. The other end of the first magnetic part 41 is electrically connected to the second magnetic pole 32. One end of the first conductive part 51 is electrically connected to the first magnetic pole 31. The other end of the first conductive part 51 is electrically connected to the first magnetic pole 31. The terminal 38a is electrically connected to the first magnetic pole 31. The terminal 38b is electrically connected to the second magnetic pole 32. The element current 20i, the first magnetic part current 41i, and the first conductive part current 51i are supplied through these terminals.

In the magnetic heads 110a to 113a, 120a to 123a, 111b and 121b, the configurations other than the above may be the same as the configurations of the magnetic heads 110 to 113 and 120 to 123, respectively.

Figure 23:
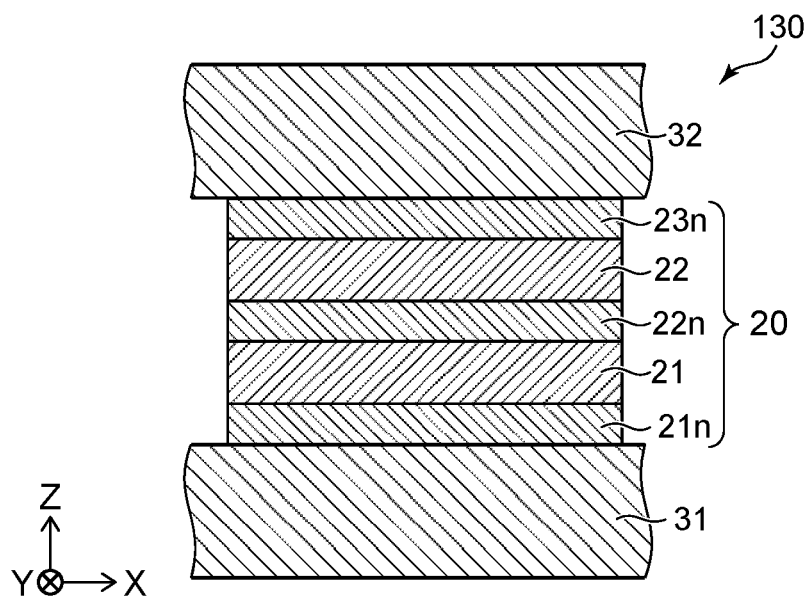
FIG. 23 is a schematic cross-sectional view illustrating a magnetic head according to the first embodiment.

FIG. 23 is a schematic cross-sectional view illustrating a magnetic head according to the first embodiment.

As shown in FIG. 23, in a magnetic head 130, the magnetic element 20 includes the first magnetic layer 21, the second magnetic layer 22, the first non-magnetic layer 21n, the second non-magnetic layer 22n, and the third non-magnetic layer 23n. The first magnetic layer 21 is provided between the first magnetic pole 31 and the second magnetic pole 32. The second magnetic layer 22 is provided between the first magnetic layer 21 and the second magnetic pole 32. The first non-magnetic layer 21n is provided between the first magnetic pole 31 and the first magnetic layer 21. The second non-magnetic layer 22n is provided between the first magnetic layer 21 and the second magnetic layer 22. The third non-magnetic layer 23n is provided between the second magnetic layer 22 and the second magnetic pole 32.

The first magnetic layer 21 and the second magnetic layer 22 include, for example, at least one selected from the group consisting of Fe, Co, and Ni. The first magnetic layer 21 and the second magnetic layer 22 are, for example, ferromagnetic layers.

The first non-magnetic layer 21n includes, for example, at least one selected from the group consisting of Cu, Au, Cr, Al, V and Ag. The second non-magnetic layer 22n includes, for example, at least one selected from the group consisting of Cu, Au, Cr, Al, V and Ag. The third non-magnetic layer 23n includes, for example, at least one selected from the group consisting of Ru, Ir, Ta, Rh, Pd, Pt and W.

When the element current 20i not less than the threshold value flows through such a magnetic element 20, an alternating magnetic field (high frequency magnetic field) is generated from the magnetic element 20. One of the first magnetic layer 21 and the second magnetic layer 22 functions as, for example, an oscillation layer. The other of the first magnetic layer 21 and the second magnetic layer 22 functions as, for example, a spin injection layer. The magnetic element 20 functions as an STO. For example, when the electric circuit 20D (see FIG. 3) supplies the element current 20i to the magnetic element 20, the alternating magnetic field is generated from the magnetic element 20. The frequency of the alternating magnetic field is, for example, not less than 20 GHz and not more than 40 GHz.

The configuration of the magnetic head 130 may be applied to the magnetic heads 110 to 113, the magnetic heads 120 to 123, the magnetic heads 110a to 113a, the magnetic heads 120a to 123a, the magnetic heads 111b, the magnetic heads 121b, and the like.

In the embodiment, the first magnetic layer 21 may include multiple magnetic regions arranged along the X-axis direction. The second magnetic layer 22 may include multiple magnetic regions arranged along the X-axis direction.

The boundaries between the magnetic regions may be clear or unclear. For example, the multiple magnetic regions are continuous.

In the embodiment, the first magnetic pole 31 may include multiple magnetic regions arranged along the X-axis direction. The second magnetic pole 32 may include multiple magnetic regions arranged along the X-axis direction. The first magnetic layer 21 may include multiple magnetic regions arranged along the X-axis direction. The second magnetic layer 22 may include multiple magnetic regions arranged along the X-axis direction. The boundaries between the magnetic regions may be clear or unclear. For example, the multiple magnetic regions are continuous.

In the above example, the heat of the magnetic element is discharged by the current flowing through the magnetic member 40. In another example according to the embodiment, the orientation of the current may be opposite to the orientation of the current when the heat of the magnetic element 20 is discharged. In this case, the temperature of the magnetic element 20 rises. As a result, in the magnetic element 20, for example, the reversal speed of magnetization increases. For example, the time until oscillation starts becomes shorter.

Hereinafter, an example of the magnetic head and the magnetic recording medium 80 included in the magnetic recording device 210 according to the embodiment will be described. The following description may be applied to any magnetic head according to the embodiment. In the following figures, the insulating member 30i, the magnetic member 40, and the conductive member 50 are omitted.

Figure 24:
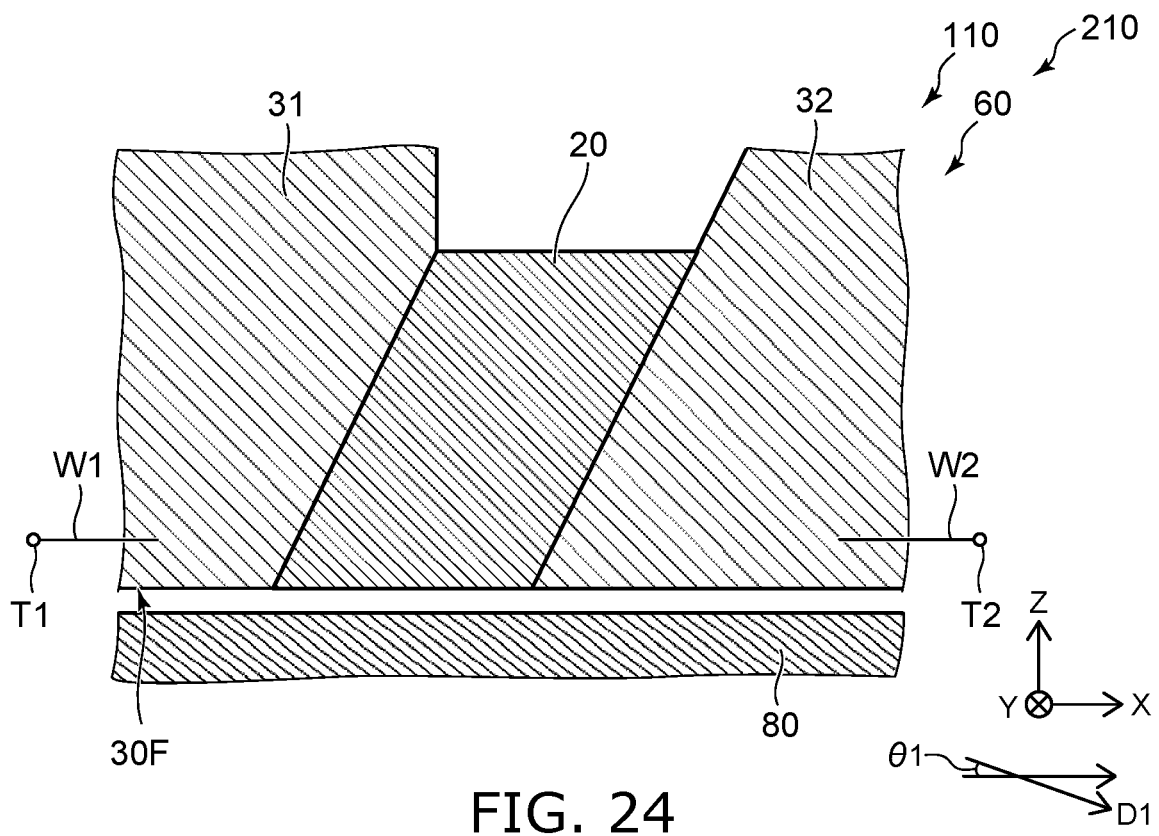
FIG. 24 is a schematic cross-sectional view illustrating the magnetic head according to the embodiment.

FIG. 24 is a schematic cross-sectional view illustrating the magnetic head according to the embodiment.

As shown in FIG. 24, in the magnetic head according to the embodiment (for example, the magnetic head 110), the first direction D1 from the first magnetic pole 31 to the second magnetic pole 32 may be inclined with respect to the X-axis direction. The first direction D1 corresponds to the stacking direction of the magnetic elements 20. The X-axis direction is along the medium-facing surface 30F. The absolute value of the angle between the first direction D1 and the medium-facing surface 30F is defined as an angle θ1. The angle θ1 is, for example, not less than 15 degrees and not more than 30 degrees. The angle θ1 may be 0 degrees.

When the first direction D1 is inclined with respect to the X-axis direction, the thickness of the layer corresponds to the length along the first direction D1. The configuration in which the first direction D1 is inclined with respect to the X-axis direction may be applied to any magnetic head according to the embodiment. For example, the interface between the first magnetic pole 31 and the magnetic element 20 and the interface between the magnetic element 20 and the second magnetic pole 32 may be inclined with respect to the X-axis direction.

Figure 25:
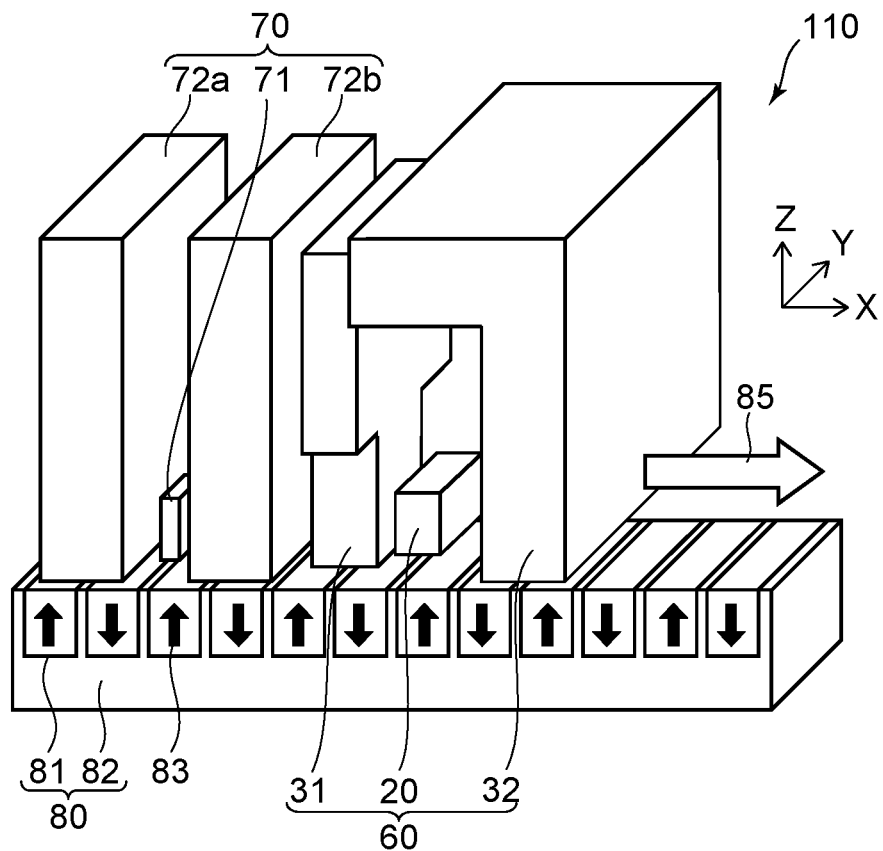
FIG. 25 is a schematic perspective view illustrating the magnetic recording device according to the embodiment.

FIG. 25 is a schematic perspective view illustrating the magnetic recording device according to the embodiment.

As shown in FIG. 25, the magnetic head according to the embodiment (for example, magnetic head 110) is used together with the magnetic recording medium 80. In this example, the magnetic head 110 includes the recording part 60 and the reproducing part 70. Information is recorded on the magnetic recording medium 80 by the recording part 60 of the magnetic head 110. The reproduction part 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording part 60. For example, perpendicular magnetic recording is performed.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 can output a signal corresponding to the magnetization 83 of the magnetic recording layer 81.

As shown in FIG. 25, the magnetic recording medium 80 moves relative to the magnetic head 110 in a direction of a medium movement direction 85. The magnetic head 110 controls the information corresponding to the magnetization 83 of the magnetic recording layer 81 at an arbitrary position. The magnetic head 110 reproduces the information corresponding to the magnetization 83 of the magnetic recording layer 81 at an arbitrary position.

Figure 26:
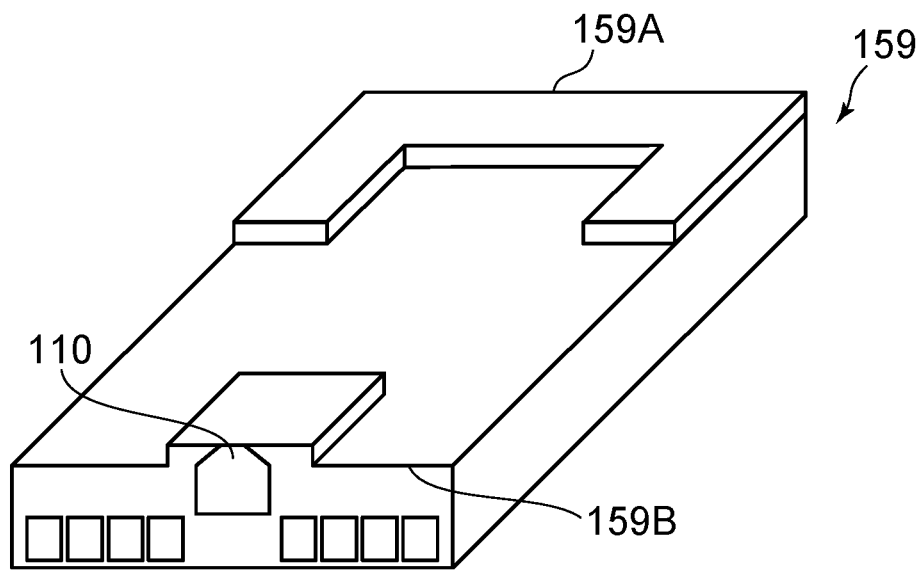
FIG. 26 is a schematic perspective view illustrating a part of the magnetic recording device according to the embodiment.

FIG. 26 is a schematic perspective view illustrating a part of the magnetic recording device according to the embodiment.

FIG. 26 illustrates a head slider.

The magnetic head 110 is provided on the head slider 159. The head slider 159 includes, for example, $Al_2O_3$/TiC and the like. The head slider 159 moves relative to the magnetic recording medium while floating or contacting the magnetic recording medium.

The head slider 159 has, for example, an air inflow side 159A and an air outflow side 159B. The magnetic head 110 is provided on a side surface of the air outflow side 159B of the head slider 159. As a result, the magnetic head 110 moves relative to the magnetic recording medium while floating or contacting the magnetic recording medium.

Figure 27:
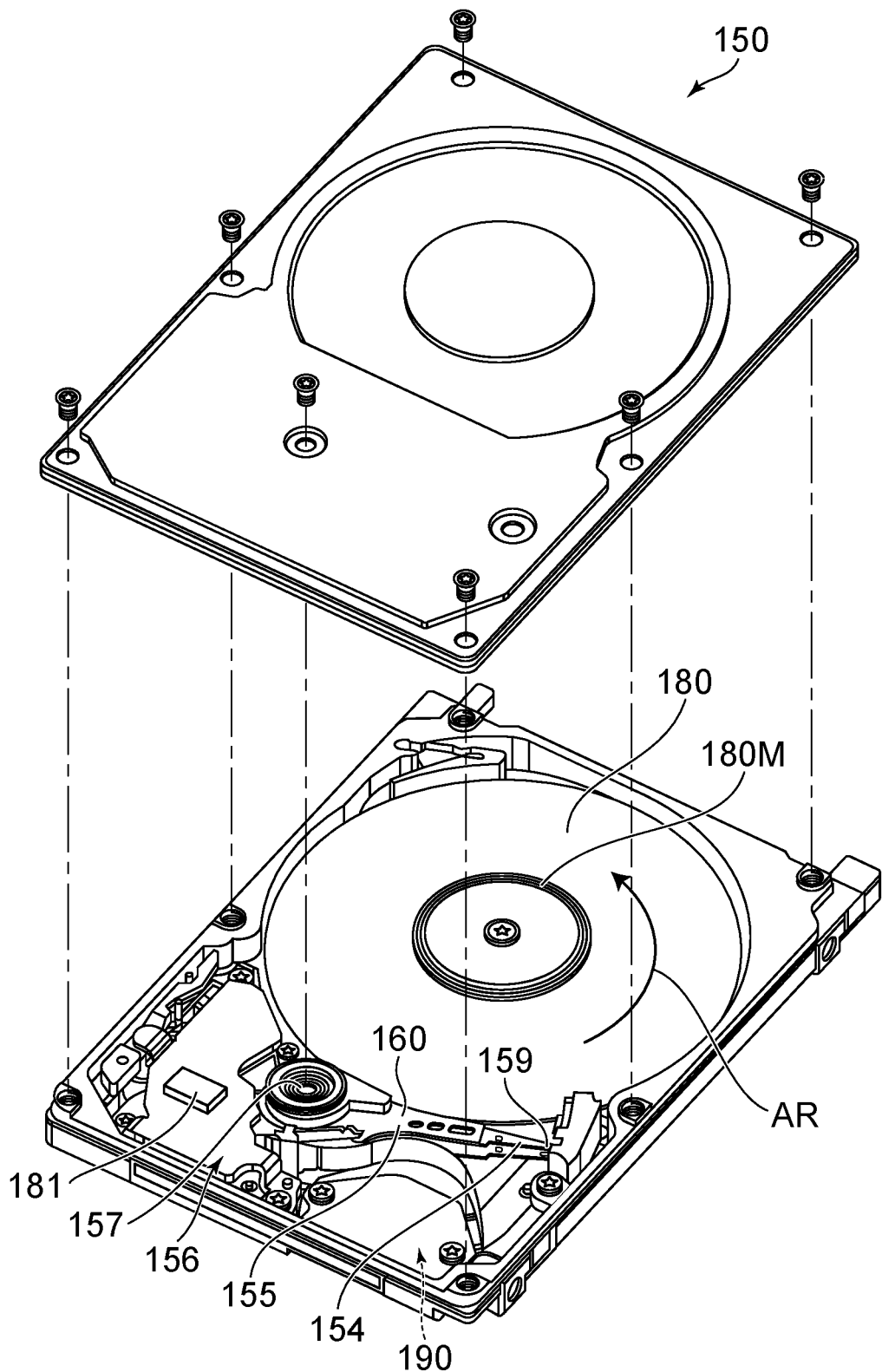
FIG. 27 is a schematic perspective view illustrating the magnetic recording device according to the embodiment.

FIG. 27 is a schematic perspective view illustrating the magnetic recording device according to the embodiment.

As shown in FIG. 27, in the magnetic recording and reproducing device 150 according to the embodiment, a rotary actuator is used. The recording medium disk 180 is mounted on a spindle motor 180M. The recording medium disk 180 is rotated in the direction of the arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of the thin film suspension 154. A magnetic head according to the embodiment is provided near the tip of the head slider 159.

When the recording medium disk 180 rotates, the downward pressure due to the suspension 154 and the pressure generated on the medium-facing surface (ABS) of the head slider 159 are balanced. The distance between the medium-facing surface of the head slider 159 and the surface of the recording medium disk 180 is a predetermined fly height. In the embodiment, the head slider 159 may be in contact with the recording medium disk 180. For example, a contact-sliding type may be applied.

The suspension 154 is connected to one end of the arm 155 (for example, an actuator arm). The arm 155 has, for example, a bobbin part and the like. The bobbin part holds the drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin part of the arm 155. The magnetic circuit includes a permanent magnet and an opposed yoke. The drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

Figure 28A:
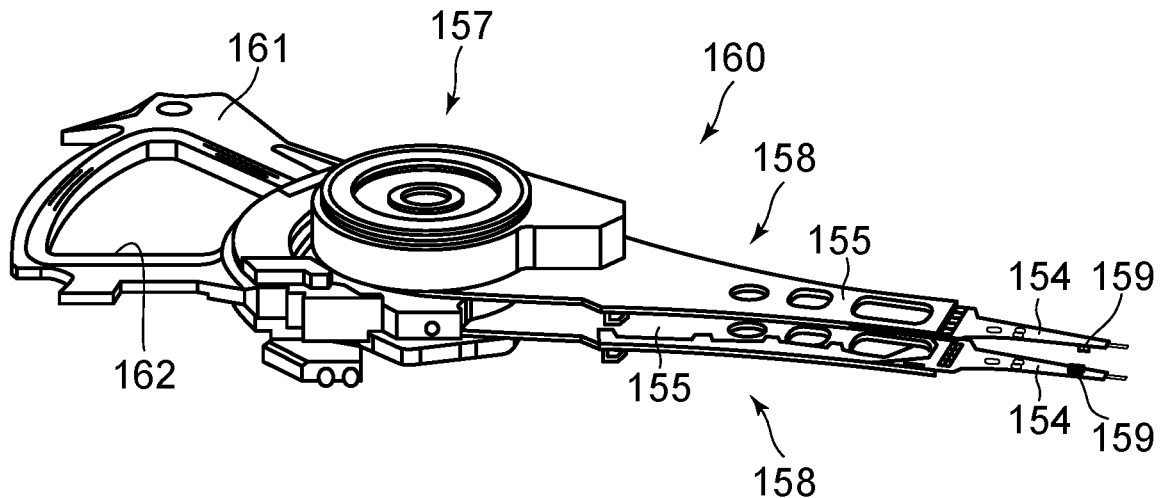
FIGS. 28A and 28B are schematic perspective views illustrating a part of the magnetic recording device according to the embodiment.
Figure 28B:
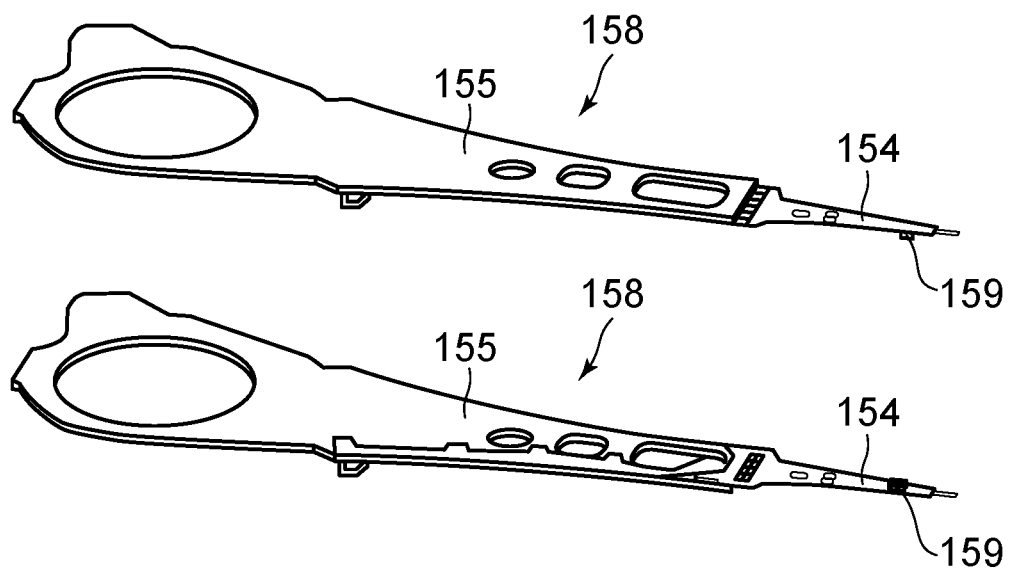

FIGS. 28A and 28B are schematic perspective views illustrating a part of the magnetic recording device according to the embodiment.

FIG. 28A illustrates the configuration of a part of the magnetic recording device and is an enlarged perspective view of a head stack assembly 160. FIG. 28B is a perspective view illustrating a magnetic head assembly (head gimbal assembly: HGA) 158 that is a part of the head stack assembly 160.

As shown in FIG. 28A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 28B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, a lead wire (not shown) for recording and reproducing a signal. The suspension 154 may include, for example, a lead wire (not shown) for a heater for adjusting the fly height. The suspension 154 may include a lead wire (not shown) for, for example, a spin transfer torque oscillator. These lead wires and multiple electrodes provided on the magnetic head are electrically connected.

The signal processor 190 is provided in the magnetic recording device 150. The signal processor 190 records and reproduces the signal on the magnetic recording medium using the magnetic head. In the signal processor 190, the input/output lines of the signal processor 190 are connected to, for example, the electrode pads of the head gimbal assembly 158, and electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces the signal on the magnetic recording medium using the magnetic head.

For example, the recording medium disk 180 is used as the above magnetic recording medium. The movable part includes, for example, the head slider 159. The position controller includes, for example, the head gimbal assembly 158.

The embodiment may include the following configuration (for example, a technical proposal).

Configuration 1

A magnetic head, comprising:
a first magnetic pole;
a second magnetic pole;
a magnetic element provided between the first magnetic pole and the second magnetic pole, and including a first magnetic layer; and
a magnetic member including a first magnetic part, a second direction from the first magnetic part to the magnetic element crossing a first direction from the first magnetic pole to the second magnetic pole,
the first magnetic part including a magnetic material including at least one of a first material, a second material or a third material,
the first material including at least one selected from the group consisting of $Mn_3Sn$, $Mn_3Ge$ and $Mn_3Ga$,
the second material including at least one selected from the group consisting of a cubic or tetragonal compound including Mn and Ni, a cubic alloy including γ-phase Mn, and a cubic alloy including Fe, and
the third material including an antiferromagnet.

Configuration 2

The magnetic head according to Configuration 1, further comprising:
a plurality of terminals,
an element current supplied via at least a part of the plurality of terminals flowing through the magnetic element along the first direction, and
a first magnetic part current supplied via at least a part of the plurality of terminals flowing through the first magnetic part along the first direction.

Configuration 3

The magnetic head according to Configuration 2, wherein an orientation of the first magnetic part current is opposite to an orientation of the element current.

Configuration 4

The magnetic head according to Configuration 1, further comprising:
a conductive member including a first conductive part; and
a plurality of terminals,
a direction from the first conductive part to the first magnetic part being along the second direction,
an element current supplied via at least a part of the plurality of terminals flowing through the magnetic element along the first direction,
a first magnetic part current supplied via at least a part of the plurality of terminals flowing through the first magnetic part along the first direction, and a first conductive part current supplied via at least a part of the plurality of terminals flowing through the first conductive part along the first direction.

Configuration 5

The magnetic head according to Configuration 4, wherein the first magnetic part is between the first conductive part and the magnetic element in the second direction.

Configuration 6

The magnetic head according to Configuration 4, wherein the first conductive part is between the first magnetic part and the magnetic element in the second direction.

Configuration 7

The magnetic head according to any one of Configurations 1 to 6, wherein
the conductive member includes at least one selected from the group consisting of Pt, Pd, Au, W, and Ta.

Configuration 8

The magnetic head according to Configuration 1, wherein
at least one of the first magnetic pole or the second magnetic pole includes a medium-facing surface,
an absolute value of an angle between the first direction and the medium-facing surface is not more than 10 degrees, and
the second direction is along the medium-facing surface.

Configuration 9

The magnetic head according to Configuration 1, wherein
at least one of the first magnetic pole or the second magnetic pole includes a medium-facing surface,
an absolute value of an angle between the first direction and the medium-facing surface is not more than 10 degrees, and
the second direction crosses the medium-facing surface.

Configuration 10

The magnetic head according to Configuration 3 or 4, wherein
an orientation of magnetization of the first magnetic part is along a third direction crossing a plane including the first direction and the second direction.

Configuration 11

The magnetic head according to Configuration 3, wherein
the magnetic member further includes a second magnetic part including the magnetic material, and
the magnetic element is between the first magnetic part and the second magnetic part in the second direction.

Configuration 12

The magnetic head according to Configuration 11, further comprising:
a plurality of terminals,
an element current supplied via at least a part of the plurality of terminals flowing through the magnetic element along the first direction,
a first magnetic part current supplied via at least a part of the plurality of terminals flowing through the first magnetic part along the first direction, and
a second magnetic part current supplied via at least a part of the plurality of terminals flowing through the second magnetic part along the first direction.

Configuration 13

The magnetic head according to Configuration 11, further comprising:
a conductive member including a first conductive part and a second conductive part; and
a plurality of terminals,
the magnetic element being between the first conductive part and the second conductive part in the second direction,
an element current supplied via at least a part of the plurality of terminals flowing through the magnetic element along the first direction,
a first magnetic part current supplied via at least a part of the plurality of terminals flowing through the first magnetic part along the first direction,
a first conductive part current supplied via at least a part of the plurality of terminals flowing through the first conductive part along the first direction,
a second magnetic part current supplied via at least a part of the plurality of terminals flowing through the second magnetic part along the first direction, and
a second conductive part current supplied via at least a part of the plurality of terminals flowing through the second conductive part along the first direction.

Configuration 14

The magnetic head according to Configuration 13, wherein
the first magnetic part is between the first conductive part and the magnetic element in the second direction, and
the second magnetic part is between the magnetic element and the second conductive part in the second direction.

Configuration 15

The magnetic head according to Configuration 13, wherein
the first conductive part is between the first magnetic part and the magnetic element in the second direction, and
the second conductive part is between the magnetic element and the second magnetic part in the second direction.

Configuration 16

The magnetic head according to any one of Configurations 11 to 15, wherein
an orientation of magnetization of the first magnetic part is along a third direction crossing a plane including the first direction and the second direction, and
an orientation of the second magnetic part is along the third direction, and includes a component opposite to the orientation of the magnetization of the first magnetic part.

Configuration 17

The magnetic head according to any one of Configurations 11 to 15, wherein
the magnetic member further includes a third magnetic part including the magnetic material, and
a direction from the magnetic element to the third magnetic part is along a third direction crossing an plane including the first direction and the second direction.

Configuration 18

The magnetic head according to any one of Configurations 11 to 17, wherein
the magnetic element further includes
a first non-magnetic layer provided between the first magnetic pole and the first magnetic layer, and
a second non-magnetic layer provided between the first magnetic member and the second magnetic pole.

Configuration 19

The magnetic head according to any one of Configurations 1 to 17, wherein
the magnetic element further includes
a second magnetic layer provided between the first magnetic pole and the first magnetic layer,
a first non-magnetic layer provided between the first magnetic pole and the first magnetic layer,
a second non-magnetic layer provided between the first magnetic layer and the second magnetic layer, and a third non-magnetic layer provided between the second magnetic layer and the second magnetic pole.

Configuration 20

A magnetic recording device, comprising:
the magnetic head according to Configuration 2;
an electric circuit,
the electric circuit being configured to supply the element current to the magnetic element, and being configured to supply the first magnetic part current to the first magnetic part.

According to the embodiment, a magnetic head and a magnetic recording device can be provided, in which a recording density is possible to be improved.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, magnetic elements, magnetic layers, non-magnetic layers, terminals, wires, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

What is claimed is:

1. A magnetic head, comprising:
a first magnetic pole;
a second magnetic pole;
a magnetic element provided between the first magnetic pole and the second magnetic pole, and including a first magnetic layer; and
a magnetic member including a first magnetic part, a second direction from the first magnetic part to the magnetic element crossing a first direction from the first magnetic pole to the second magnetic pole;
a conductive member including a first conductive part; and
a plurality of terminals,
the first magnetic part including a magnetic material including at least one of a first material, a second material or a third material,
the first material including at least one selected from the group consisting of $Mn_3Sn$, $Mn_3Ge$ and $Mn_3Ga$,
the second material including at least one selected from the group consisting of a cubic or tetragonal compound including Mn and Ni, a cubic alloy including γ-phase Mn, and a cubic alloy including Fe,
the third material including an antiferromagnet, and
a direction from the first conductive part to the first magnetic part being along the second direction.

2. The head according to claim 1, wherein
the first magnetic part is between the first conductive part and the magnetic element in the second direction.

3. The head according to claim 1, wherein
the first conductive part is between the first magnetic part and the magnetic element in the second direction.

4. The head according to claim 1, wherein
the conductive member includes at least one selected from the group consisting of Pt, Pd, Au, W, and Ta.

5. The head according to claim 1, wherein
at least one of the first magnetic pole and the second magnetic pole includes a medium-facing surface, and
the second direction is along the medium-facing surface.

6. The head according to claim 1, wherein
at least one of the first magnetic pole and the second magnetic pole includes a medium-facing surface, and
the second direction crosses the medium-facing surface.

7. The head according to claim 1, wherein
an orientation of magnetization of the first magnetic part is along a third direction crossing a plane including the first direction and the second direction.

8. The head according to claim 1, wherein
the magnetic member further includes a second magnetic part including the magnetic material, and
the magnetic element is between the first magnetic part and the second magnetic part in the second direction.

9. The head according to claim 8, wherein
an element current supplied via at least a part of the plurality of terminals flows through the magnetic element along the first direction,
a first magnetic part current supplied via at least a part of the plurality of terminals flows through the first magnetic part along the first direction, and
a second magnetic part current supplied via at least a part of the plurality of terminals flows through the second magnetic part along the first direction.

10. The head according to claim 8, wherein
the conductive member further includes a second conductive part,
the magnetic element is between the first conductive part and the second conductive part in the second direction.

11. The head according to claim 10, wherein
the first magnetic part is between the first conductive part and the magnetic element in the second direction, and
the second magnetic part is between the magnetic element and the second conductive part in the second direction.

12. The head according to claim 10, wherein
the first conductive part is between the first magnetic part and the magnetic element in the second direction, and
the second conductive part is between the magnetic element and the second magnetic part in the second direction.

13. The head according to claim 10, wherein
a first magnetic part current supplied via at least a part of the plurality of terminals flows through the first magnetic part along the first direction,
a first conductive part current supplied via at least a part of the plurality of terminals flows through the first conductive part along the first direction,
a second magnetic part current supplied via at least a part of the plurality of terminals flows through the second magnetic part along the first direction, and a second conductive part current supplied via at least a part of the plurality of terminals flows through the second conductive part along the first direction.

14. The head according to claim 8, wherein an orientation of magnetization of the first magnetic part is along a third direction crossing a plane including the first direction and the second direction, and an orientation of the second magnetic part is along the third direction, and includes a component opposite to the orientation of the magnetization of the first magnetic part.

15. The head according to claim 8, wherein the magnetic member further includes a third magnetic part including the magnetic material, and a direction from the magnetic element to the third magnetic part is along a third direction crossing a plane including the first direction and the second direction.

16. The head according to claim 8, wherein the magnetic element further includes a first non-magnetic layer provided between the first magnetic pole and the first magnetic layer, and a second non-magnetic layer provided between the first magnetic layer and the second magnetic pole.

17. The head according to claim 1, wherein the magnetic element further includes a second magnetic layer provided between the first magnetic pole and the first magnetic layer, a first non-magnetic layer provided between the first magnetic pole and the first magnetic layer, a second non-magnetic layer provided between the first magnetic layer and the second magnetic layer, and a third non-magnetic layer provided between the second magnetic layer and the second magnetic pole.

18. The head according to claim 1, wherein an element current supplied via at least a part of the terminals flows through the magnetic element along the first direction.

19. A magnetic recording device, comprising:

the magnetic head according to claim 18; and an electric circuit, the electric circuit being configured to supply the element current to the magnetic element, and being configured to supply a current to the first magnetic part.

20. A magnetic recording device, comprising:

the magnetic head according to claim 1; and a magnetic recording medium, the magnetic head being configured to record information on the magnetic recording medium.

\* \* \* \* \*